(12) United States Patent
Ota et al.

(10) Patent No.: US 6,950,573 B2
(45) Date of Patent: Sep. 27, 2005

(54) OPTICAL WAVEGUIDES, LENS ARRAY AND LASER COLLECTING DEVICE

(75) Inventors: Hiromichi Ota, Kariya (JP); Yoshinobu Katoh, Toyohashi (JP); Yasuo Niino, Aichi-ken (JP); Tomomi Nakano, Toyoake (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 272 days.

(21) Appl. No.: 10/382,496

(22) Filed: Mar. 7, 2003

(65) Prior Publication Data
US 2003/0223686 A1 Dec. 4, 2003

(30) Foreign Application Priority Data

Mar. 8, 2002 (JP) ......................................... 2002-064259
Aug. 29, 2002 (JP) ......................................... 2002-251210

(51) Int. Cl.⁷ .............................. G02B 6/26; G02B 6/42; G02B 27/10
(52) U.S. Cl. ............................... 385/32; 385/88; 372/6; 372/101; 359/619; 359/622
(58) Field of Search ........................... 385/31, 32, 34, 385/35, 43, 88, 92, 93, 94, 105, 146, 24, 106; 359/204, 364, 619, 622, 623, 628, 641, 719; 372/6, 75, 101, 108, 109

(56) References Cited

U.S. PATENT DOCUMENTS

| | | | |
|---|---|---|---|
| 4,688,884 A | * | 8/1987 | Scifres et al. ................. 385/38 |
| 5,825,803 A | * | 10/1998 | Labranche et al. ......... 372/101 |
| 5,900,981 A | * | 5/1999 | Oren et al. ................. 359/619 |
| 6,005,717 A | | 12/1999 | Neuberger et al. .......... 359/619 |
| 6,044,096 A | * | 3/2000 | Wolak et al. .................. 372/36 |
| 6,324,326 B1 | * | 11/2001 | Dejneka et al. ............. 385/123 |
| 6,433,934 B1 | * | 8/2002 | Reznichenko et al. ...... 359/622 |
| 6,666,590 B2 | * | 12/2003 | Brosnan ...................... 385/93 |
| 6,819,861 B2 | * | 11/2004 | Ota et al. .................... 385/146 |
| 2004/0033024 A1 | * | 2/2004 | Remillard et al. ........... 385/49 |

FOREIGN PATENT DOCUMENTS

| | | |
|---|---|---|
| EP | 0 870 978 | 10/1998 |
| EP | 1 137 130 | 9/2001 |

OTHER PUBLICATIONS

Patent Abstracts of Japan, JP 2000–098191, Apr. 7, 2000.

\* cited by examiner

Primary Examiner—Frank G. Font
Assistant Examiner—James P. Hughes
(74) Attorney, Agent, or Firm—Oblon, Spivak, McClelland, Maier & Neustadt, P.C.

(57) ABSTRACT

Optical waveguides, lens arrays and laser collecting devices are disclosed. The optical waveguide is formed with an output surface which is made smaller in dimension in a fast axis direction than an input surface. The waveguide collects in the fast axis direction plural laser beams output from plural laser emitting parts arranged in the fast axis direction and outputs from the output surface. The entrance surface of the optical waveguide is provided with first lenses to correspond respectively to the plural laser emitting parts. Each of the first lenses is located to be offset first predetermined distances from a corresponding one of the laser emitting parts in the beam traveling direction and in said fast axis direction, and the first predetermined distances are determined for each of the first lens in taking into account the focal length of each first lens and an angle which each first lens makes with the output surface of the waveguide.

8 Claims, 19 Drawing Sheets

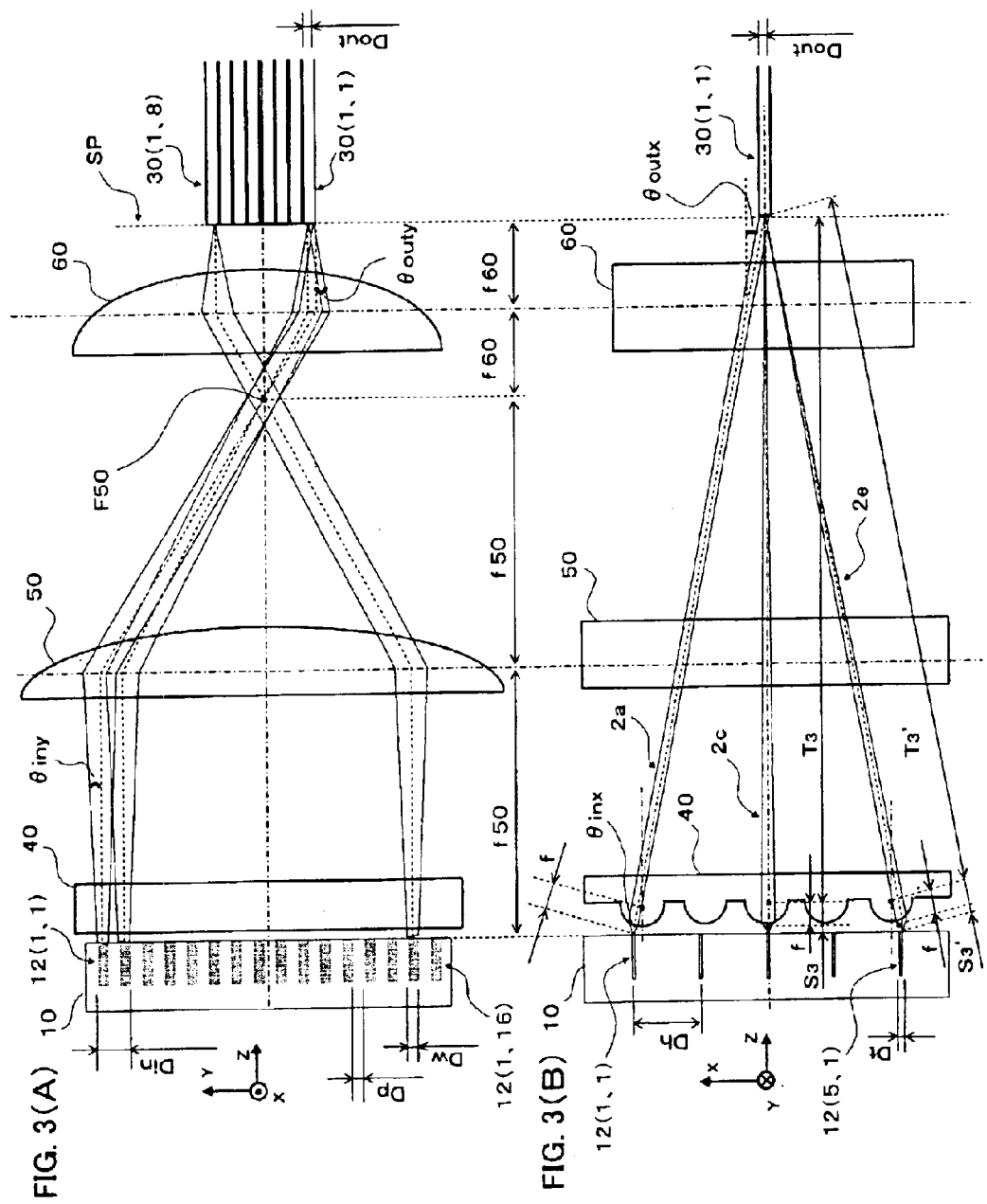

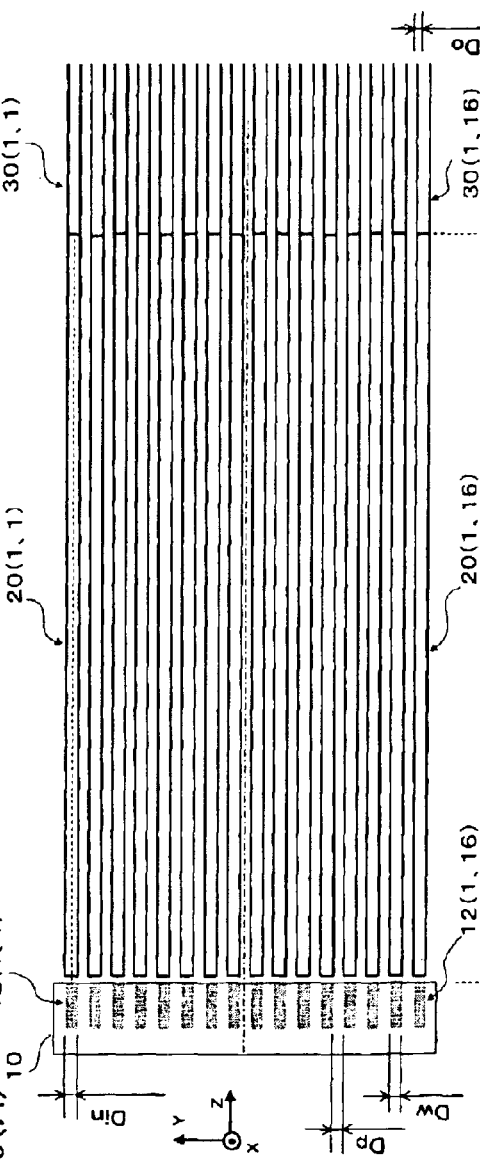
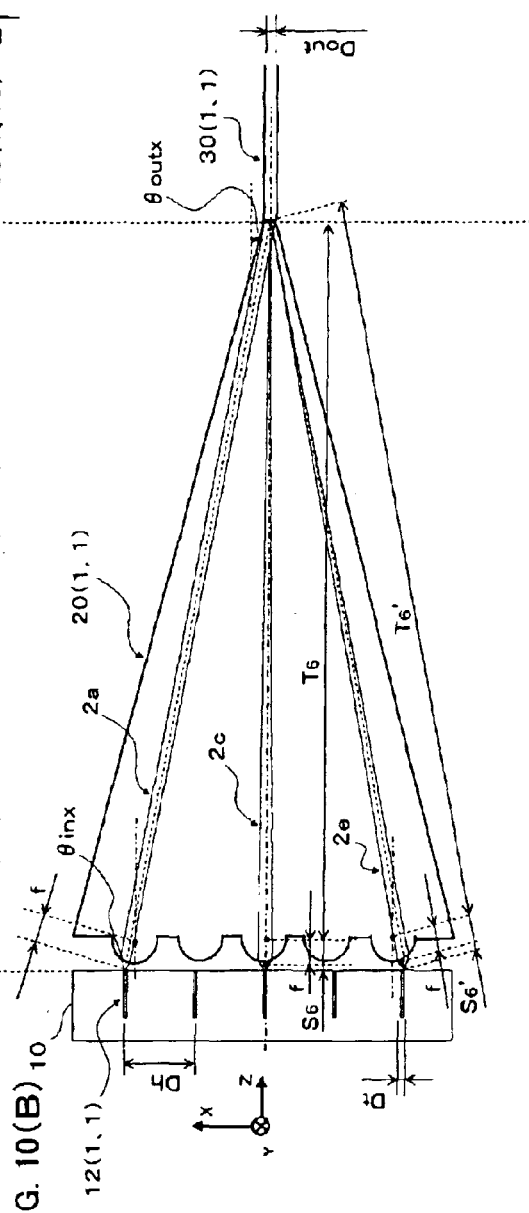
FIG. 10(A)
FIG. 10(B)

THE NUMBER IN RADIAL DIRECTION OF FIBERS BUNDLED

PRIOR ART

PRIOR ART

OPTICAL WAVEGUIDES, LENS ARRAY AND LASER COLLECTING DEVICE

INCORPORATION BY REFERENCE

The present application claims priority under 35 U.S.C. .sctn. 119 to Japanese Patent Application No. 2002-251210, filed on Aug. 29, 2002 and its parent Japanese Patent Application No. 2002-64259, filed on Mar. 8, 2002. The contents of these applications are incorporated herein by reference in their entireties.

BACKGROUND OF THE INVENTION

1. Field of the Invention

The present invention relates to optical waveguides and lens array for collecting laser beams and a laser collecting device incorporating the same.

2. Description of the Related Art

FIG. 14 shows a general construction of a semiconductor laser beam collecting device known as prior art. The semiconductor laser beam (hereafter referred simply as "laser beam") 2 is emitted from a beam emitting part 12 on an active layer of a semiconductor laser (like a laser diode or the like) and takes the form of an elliptical in the section normal to the direction in which the laser beam 2 travels. The laser beam 2 of the elliptical form has a fast axis direction and a slow axis direction. The longer the elliptical form is distanced from the beam emitting part 12, the larger it becomes. There has been known a semiconductor laser beam collecting device of the type wherein laser beams emitted from a plurality of beam emitting parts which are arranged in a second-order matrix extending in the fast axis direction and in the slow axis direction are collected by optical fibers of a fewer number to reinforce the output of the laser beams.

For example, where the semiconductor lasers are to be employed as a power source for a laser machining apparatus or a laser material processing apparatus, it must be of a high power. The laser beam emitted from a single beam emitting part is weak in power strength. Thus, a group of lenses are used to collect laser beams emitted from a plurality of beam emitting parts thereby to strengthen the output of the laser beams.

Japanese patent publication No. 2000-98191 discloses a semiconductor laser beam collecting device shown in FIG. 14 as prior art. In the publication, it is proposed to collect laser beams to optical fibers thereby to strengthen the beam output power by utilizing a group of lenses and the optical fibers 30 and arranging a collimating lens array 70 extending in the fast axis direction, a collective lens 80 for collecting beams in the fast axis direction and a collective lens 90 for collecting beams in the slow axis direction, in turn within a space from the beam emitting parts 12 to the optical fibers 30.

In order that laser beams emitted from semiconductor laser emitting parts are collected efficiently to optical fibers thereby to strengthen the output power of the laser beams, it is necessary to gain the density of the beams by entering the beams from much more number of the emitting parts into much finer optical fibers and to enter the beams efficiently into the optical fibers by entering the beams into the entrance surfaces of the optical fibers at a smaller incident angle, namely, at an angle as close as the right angle to the entrance surfaces without reflecting the entered laser beams outside.

The laser beams coming from the emitting parts 12 advance as they spread in the fast axis direction as well as in the slow axis direction. For collection of the laser beams which advance as spreading, the lenses used themselves and the arrangement of the same are to be quite highly accurate.

In the semiconductor laser collecting device known heretofore (e.g., from the aforementioned Japanese patent publication No. 2000-981919, the emitting parts are arranged with a relatively wide spacing in the fast axis direction, and correcting the beams in that direction is carried out once they are transformed into parallel beams. On the other hand, the emitting portions are arranged with a relatively narrow spacing in the slow axis direction, which requires that the lenses used be very small in diameter and difficult to arrange. Thus, collecting the beams in the slow axis direction is carried out without transforming the beams into those parallel.

As understood from the foregoing, the prior art device mentioned above involves the following problems to be solved.

Referring to FIGS. 15(A) and 15(B), the spacing between the slow axis beam collective lens array 90 and the emitting parts 12 is short. It is therefore difficult to arrange the fast axis collimation lens array 70 and the slow axis beam collective lens array 90 properly within the short spacing. The optical fibers 30 are caused to be arranged within a short distance from the emitting parts 12. Thus, where the incident angle (θoutx) in the fast axis direction is set small, the number of the laser beams which can be collected in the fast axis direction is made small, so that it cannot be practiced to obtain high power laser beams from a large number of optical fibers for use in laser machining.

SUMMARY OF THE INVENTION

It is therefore a primary object of the present invention to provide an optical waveguide, a lens array and a laser collecting device which are capable of collecting the laser beams output from plural emitting part of a semiconductor laser array at higher efficiency and also capable of being easier for reduction to practice.

Briefly, according to the present invention, there is provided an optical waveguide for receiving at an entrance surface thereof plural laser beams which advance as spreading in a fast axis direction and a slow axis direction and for collecting the received laser beams in a predetermined direction to output the collected laser beams from an output surface thereof. The waveguide is constituted such that the output surface is made smaller in dimension in the fast axis direction than the entrance surface and that plural laser beams received at the entrance surface from plural laser emitting parts arranged in the fast axis direction are collected to be output from the output surface.

In another aspect of the preset invention, there are provided optical waveguides each comprising the aforementioned optical waveguide, for collecting plural laser beams output from plural laser emitting parts arranged in the fast axis direction as well as in the slow axis direction. In the waveguides, the number of the laser emitting parts arranged in the fast and slow axis directions and the distances in the fast and slow axis directions between the centers of any two adjacent laser emitting parts have been confirmed in advance, and the plural laser emitting parts are divided into plural first groups spaced from one another in the slow axis direction. Further, the dimension in the slow axis direction of each optical waveguide is determined to be smaller than the distance in the slow axis direction between the centers of two adjacent laser emitting parts, but to be larger than the length in the slow axis direction of each laser emitting part, and the plural waveguides are arranged in the slow axis direction respectively in correspondence to the plural first groups of the laser emitting parts arranged in the slow axis direction.

In still another aspect of the present invention, there is provided a lens array for collecting in a predetermined direction laser beams which are output from plural laser emitting parts arranged in fast and slow axis directions and which travel as they spread in the fast and slow axis directions. The number of the laser emitting parts arranged in the fast and slow axis directions and the distances in the fast and slow axis directions between the centers of any two adjacent laser emitting parts have been confirmed in advance, and the plural laser emitting parts are divided into plural second groups spaced from one another in the fast axis direction. The lens array includes plural second lenses which are arranged to extend in the slow axis direction in correspondence to the plural second groups of the plural laser emitting parts. The second lens are provided for collecting in the fast axis direction the plural laser beams input from laser emitting parts of a corresponding one of the second groups. Further, each of the second lens is constituted with an optical axis thereof being inclined toward a laser collective position at an angle depending on each such second lens, for collecting a laser beam input thereto in the fast axis direction to the laser collective position which is on a line spaced almost in parallel with the slow axis direction a predetermined distance from a laser emitting surface including the plural laser emitting parts arranged in the fast and slow axis directions. The second lens with the optical axis inclined may be all or but one thereof.

In a further aspect of the present invention, there is provided a laser collecting device comprising the aforementioned lens array and a slow axis beam collective lens for collecting laser beams output from plural laser emitting parts. The number of the laser emitting parts arranged in the fast and slow axis directions and the distances in the fast and slow axis directions between the centers of any two adjacent laser emitting parts have been confirmed in advance, and the plural laser emitting parts are divided into plural second groups spaced from one another in the fast axis direction. The lens array is located to make the second lenses thereof correspond respectively to the second groups, and the slow axis beam collective lens is arranged between the lens array and the laser collective position, whereby plural laser beams output from the plural laser emitting parts arranged in the fast and slow axis directions are collected by the lens array on a lens-by-lens basis in the fast axis direction toward a laser collective position and are further collected by the slow axis beam collective lens in the slow axis direction thereby to be collected in the fast and slow axis directions to the laser collective position.

In a further aspect of the present invention, there is provided a laser collecting device comprising the aforementioned optical waveguides, optical fibers and a collective lens, for collecting laser beams output from plural laser emitting parts arranged in a fast axis direction and a slow axis direction. The number of the plural laser emitting parts arranged in the fast and slow axis directions and the distances in the fast and slow axis directions between the centers of any two adjacent laser emitting parts have been confirmed in advance, and the plural laser emitting parts are divided into plural first groups spaced in the slow axis direction. The optical waveguides are located in correspondence respectively to the plural first groups each for receiving laser beams from the laser emitting parts of a corresponding one of the first groups. The optical fibers are arranged to locate the output surfaces thereof respectively at the output surfaces of the optical waveguides, and the output surfaces of the optical fibers are bundled to make a desired shape. Further, the collective lens is provided at the side of the bundled output surfaces of the optical fibers, whereby laser beams output from the plural laser emitting parts which are arranged in the fast and slow axis directions are collected by the optical waveguides in the fast axis direction on the basis of each first group spaced from another in the slow axis direction and are entered respectively into the optical fibers to make the collective lens collect the laser beams output from the output surfaces of the optical fibers.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, wherein like reference numerals designate the same or corresponding parts throughout the several views, and in which:

FIGS. 3(A) and 3(B) are explanatory views showing the arrangement of lenses and the state of laser beams being collected through the lenses in the first embodiment;

FIGS. 10(A) and 10(B) are explanatory views showing the arrangement of optical waveguides used in the third embodiment and the state of laser beams being collected within the optical waveguides;

DETAILED DESCRIPTION OF THE PREFEERRED EMBODIMENTS

The embodiments of the present invention will be described in detail with reference to the accompanying drawings.

Figure 1:
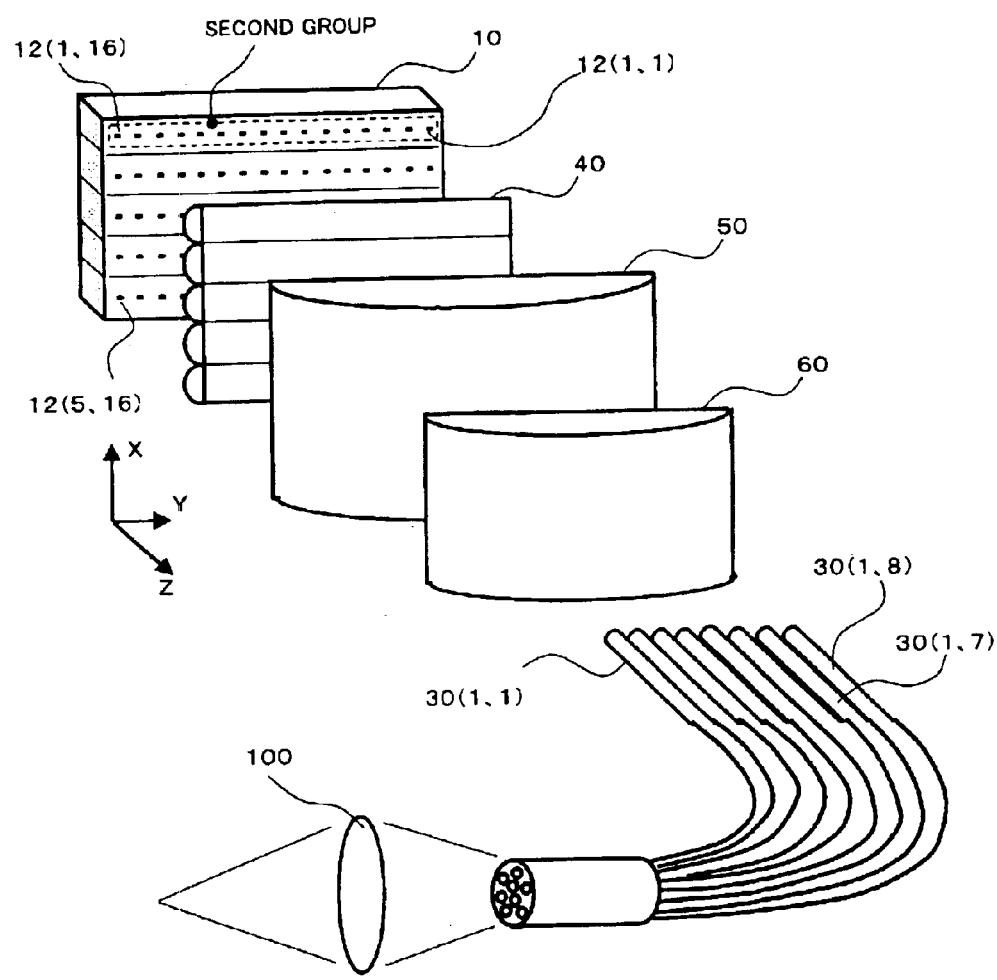
FIG. 1 is a perspective view showing the general configuration of a laser beam collecting device of the first embodiment according to the present invention.

1. First Embodiment:

FIG. 1 shows the general configuration of a laser beam collecting device of the first embodiment employing a lens array according to the present invention. In the embodiment shown in FIG. 1, the distance between a semiconductor laser array 10 and optical fibers 30 can be made longer than the corresponding distance in the prior art laser beam collecting device shown in FIG. 14. More specifically, compared to the distance of about 3.2 mm in the prior art, the distance in the first embodiment can be set more than several centimeters (cm), to be more exact, up to about 20 cm in this particular embodiment, in dependence upon the focal lengths of a lens 50 and a lens 60. The lens 50 is provided for uniforming the widths of the laser beams in the slow axis direction and will be referred to as "slow axis beam width uniforming lens". The lens 60 is provided for collecting laser beams in the slow axis direction and will be referred to as "slow axis beam collective lens". Because of the distance extended much longer, the arrangement of the lenses becomes easier and the incident angle of the beams into the optical fibers 30 can be set smaller, so that collecting the laser beams can be carried out more efficiently.

(1-1. General Configuration)

The semiconductor laser array 10 has a plurality of beam emitting parts 12 and is constituted by arranging in a two-dimensional space semiconductor lasers each with a single emitting part, or stacking in a row semiconductor lasers of an array type having plural emitting parts, or using a semiconductor laser stack on which a plurality of beam emitting parts are arranged in a two-dimensional manner. For the array 10, a semiconductor laser stack is employed in this particular embodiment.

A lens array 40 is of the constitution that lenses (second lenses) which respectively correspond to second groups divided in the fast axis direction of the emitting parts 12 (m, n) are arranged in the fast axis direction. The lens array 40 collects (more precisely, bundles or condenses) laser beams which are emitted from the emitting parts located at the same position in the slow axis direction, namely, from those vertically arranged on the same row as viewed in FIG. 1, to an entrance surface of an optical fiber 30 which is located at the corresponding position in the slow axis direction.

Herein, term "bundle" means collecting plural laser beams without effecting the substantial shrinkage in diameter of each beam, and term "condense" means shrinking the diameters of laser beams or collecting laser beams while shrinking the diameter. Also, term "collect" means reinforcing or strengthening the power of laser beams by way of "bundling" or "condensing" the beams.

The slow axis beam width uniforming lens 50 transforms the plural laser beams entered from the lens array 40, to those uniform in width in the slow axis direction. In the embodiment shown in FIG. 1, the slow axis beam width uniforming lens 50 is constituted not by plural lenses but by a single lens.

The slow axis beam collective lens 60 collects the laser beams spaced in the slow axis direction and enters every two or more beams into the entrance surface of a corresponding one of the optical fibers 30 arranged in the slow axis direction. The entrance surfaces of the optical fibers 30 are positioned respectively at beam collective positions for the respective fibers. The positions are at the same predetermined distances from a laser emitting surface which includes the plural laser emitting parts 12 of the semiconductor laser array 10 and are aligned in the slow axis direction. The collective lens 60 is constituted not by plural lenses but by a single lens.

Each of the optical fibers 30 receives laser beams to which those in the fast and slow axis directions are collected. In the instance shown in FIG. 1, five laser beams in the fast axis direction at each of sixteen rows are corrected by the lens 50 to outputs sixteen beams spacing in the slow axis direction. The sixteen beams are then collected by the lens 60 two by two to make eight beams enter respectively into eight optical fibers 30. Accordingly, the laser beams output from the plural emitting parts of the semiconductor laser array 10 are collected to a predetermined position, and the output power of the collected beams is strengthened for use in machining or the like.

(1-2. General Configuration of Lens Array 40)

The general configuration of the lens array 40 will be described with reference to FIGS. 2(A) and 2(B). The lens array 40 is constituted by arranging plural cylindrical lenses (second lenses) in correspondence to respective lines of the emitting parts which lines are spaced in the fast axis direction to extend in the slow axis direction. The cylindrical lenses have cylinder axes extending in the slow axis direction in parallel with one another.

Figure 2A:
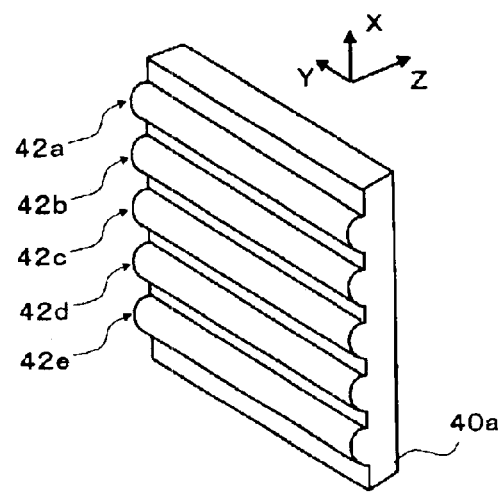
FIGS. 2(A) and 2(B) are perspective views illustrating lens arrays used in the first embodiment.
Figure 2B:
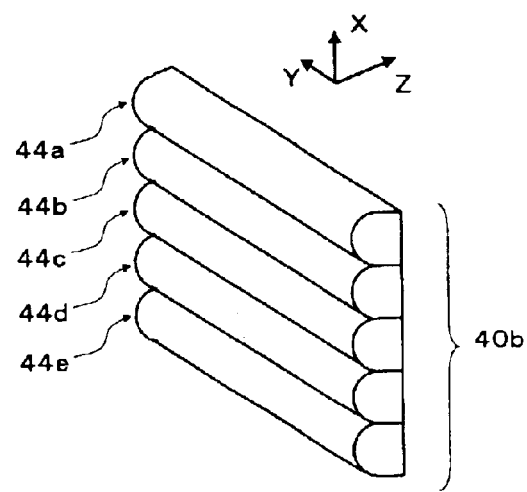

FIG. 2(A) exemplifies a lens array 40a which is constituted by forming plural lenses 42a–42e (second lenses) on a lens base member of a plate-like, while FIG. 2(B) exemplifies another lens array 40b which is constituted by stacking discrete lenses 44a–44e (second lenses) one on another. Various methods or ways may be utilized to constitute the lens array 40.

(1-3. Arrangement of Components and State of Laser Beams being Collected)

The arrangement of the emitting parts 12, lens array 40, slow axis beam width uniforming lens 50, slow axis beam collective lens 60 and optical fibers 30 and the state of laser beams being collected will be described with reference to FIGS. 3(A) and 3(B). FIG. 3(A) shows the arrangement of the components as viewed in the fast axis direction, illustrating the state that laser beams are refracted in the slow axis direction to be collected. FIG. 3(B) shows the same arrangement as viewed in the slow axis direction, illustrating the state wherein the laser beams are refracted in the fast axis direction to be collected.

In the particular embodiment shown, each emitting part 12 (m, n) of the semiconductor laser array 10 has its width Dw of about 0.2 mm in the slow axis direction and a spacing Dp of about 0.2 mm from the next thereto. With this configuration, in collecting the laser beams output from two emitting parts adjacent in the slow axis direction into a piece of optical fiber 30, the laser beam which has the width Din of about 0.6 mm at the time of being output is collected to a piece of optical fiber 30 (s, t) having the diameter Dout of about 0.2 mm.

Collecting the laser beam output from each emitting part 12 (m, n) into one of the optical fibers 30 (s, t) arranged in the slow axis direction will be described with reference to FIG. 3(A). In the arrangement shown in FIG. 3(A), the focal length f50 of the slow axis beam width uniforming lens 50 is 75 mm while the focal length f60 of the slow axis beam collective lens 60 is 25 mm. The lens 50 is set at a position spaced by the focal length f50 from the emitting part 12 (m, n), the lens 60 is set at a position spaced by the distance of the sum (f50+f50+f60) from the emitting part 12 (m, n), and the optical fibers 30 (s, t) are set at a position spaced by a distance of the sum (f50+f50+f60+f60) from the emitting part 12 (m, n). The incident angle θiny at which each laser beam output from the emitting parts 12 (m, n) spreads on one side in the slow axis direction is 3.5 degrees, while the incident angle θouty on one side in the slow axis direction of the laser beam which enters into the optical fiber 30 (s, t) is 10 degrees.

In selecting the slow axis beam width uniforming lens 50 and the slow axis beam collective lens 60, those having the focal lengths f50 and f60 which satisfy the number (t) of the optical fibers 30 (s, t) in the slow axis direction and the radius Dout thereof are selected based on the aforementioned parameters Din, Dp, Dw and θiny.

The entrance surfaces of the optical fibers 30 (s, t) are located on a line which is away by a predetermined distance (i.e., the sum of f50+f50+f60+f60 in this particular embodiment) from the emitting surface including the plural emitting parts 12 (m, n) and which extends almost in parallel with the slow axis direction. This position where the entrance surfaces of the optical fibers 30 (s, t) are aligned will be referred to as "laser collective potion" indicated at SP in FIG. 3(A).

Description on the lens array 40 is omitted because it hardly effects on the laser beams in the slow axis direction.

The laser beam output from each emitting part 12 (m, n) gradually spreads at the angle θiny (e.g., 3.5 degrees) with respect to the Z-axis and overlaps in due course with another laser beam next to. The laser beam overlapping with the next one in the slow axis direction is transformed to have the width uniformed in the slow axis direction after passing through the slow axis beam width uniforming lens 50 because the same is positioned at the position spaced by a distance corresponding to the focal length f50 from the emitting surface. The laser beams having passed through the slow axis beam width uniforming lens 50 travel at different angles with respect to the Z-axis and have almost the same widths in the slow axis direction. The centers of the laser beams with the almost uniform widths pass across the focal point (indicated at f50 in FIG. 3(A)) of the slow axis beam width uniforming lens 50.

The laser beams having passed through the slow axis beam width uniforming lens 50 then pass through the slow axis beam collective lens 60 and are collected to respective positions which are away by the distance of the focal length f60 of the lens 60, because the same is located at a position spaced by the focal length f60 from the focal point F50 of the slow axis beam width uniforming lens 50.

The optical fibers 30 (s, t) are arranged to locate the entrance surfaces thereof at the respective positions to which the slow axis beam collective lens 60 collects the laser beams (i.e., at the position spaced by the focal length f60 from the lens 60). The beams from the lens 60 are entered into the entrance surfaces of the fibers 30 (s, t). At this time, the laser beams are collected on a group-by-group basis and the beams of a certain group are collected to a corresponding optical fiber. In this particular embodiment, as two emitting parts 12 (1, 1) and 12 (1, 2) are grouped to collect the beams therefrom to one optical fiber 30 (1, 1), all of the emitting parts 12 (m, n) are grouped two by two in the slow axis direction, and the groups so made are assigned respectively to the optical fibers 30 (s, t).

The following equations apply to the device shown in FIG. 3(A).

$$D\text{out}=(f60/f50)*D\text{in}$$

$$\theta\text{outy}=\arctan\{(f50/f60)*\tan(\theta\text{iny})\}$$

$$D\text{out}/D\text{in}=\tan(\theta\text{iny})/\tan(\theta\text{outy})=f60/f50$$

For this reason, the parameters Dout and θouty can be set at discretion by properly selecting the ratio between the focal lengths f50 and f60 of the lenses 50 and 60.

Moreover, the laser beams are collected also in the fast axis direction to the positions (hereafter referred to as "laser collective positions") to which the slow axis collective lens 60 collect them.

Next, with reference to FIG. 3(B), description will be made of the mechanism for collecting the laser beams, output from the emitting parts 12 (m, n), to the entrance surfaces of the optical fibers 30 (s, t) in the fast axis direction. In FIG. 3(B), the second lens 42a–42e of the lens array 40 have their focal length (f). The laser beams output from the emitting parts 12 (m, n) spreads at an angle θinx (e.g., 40 degrees) in the fast axis direction. The laser beams which travel at opposite ends in the fast axis direction enter into the optical fibers 30 (s, t) at an angle θoutx (e.g., 10 degrees) with respect to the Z-axis. Further, the spacing between two of the emitting parts 12 (m, n) next to each other in the fast axis direction is set to Dh (e.g., 1.75 mm), and the depth Dt of each emitting part in the fast axis direction is set to about 0.002 mm.

Taking the spacing Dh and the spreading angle θinx of the emitting parts 12 (m, n) into account, the lens array 40 is formed and located to satisfy the number (S) of the targeted optical fibers 30 (s, t) in the fast axis direction and the radius (Dout) thereof and the entrance angle θoutx.

Description will be omitted as to the operations of the slow axis beam width uniforming lens 50 and the slow axis beam collective lens 60 because these lenses do not work to collect the laser beams in the fast axis direction.

The lens array 40 is located at such a position that it is at the distance of its focal length (f) from the emitting parts 12 (m, n). With the lens array 40 so located, the laser beams having passed through the lens array 40 are uniformed to have almost the same width and are collected (bundled in this case) as indicated at 2a in FIG. 3(B).

On the contrary, the lens array 40 may be located at such a position that it is at a distance (S3) a little longer than the focal length (f) thereof from the emitting parts 12 (m, n). In another case like this, the distance S3 and another distance T3 between the focal axis of each lens in the lens array 40 and the entrance surfaces of the optical fibers are determined to satisfy an equation (1/S3)+(1/T3)=(1/f), and the entrance surfaces of the optical fibers 30 (s, t) are located at the distance of (S3+T3) from the emitting parts 12. With the parameters so set, the laser beams having passed through the lens array 40 are collected (i.e., condensed in this case) as indicated at 2c–2e in FIG. 3(B).

The laser beams output from the emitting parts 12 (m, n) travel as they gradually spread at the angle θinx with respect to the Z-axis. The lenses (second lenses) on the lens array 40 are formed and located so that the spreading laser beams, after passing through the lens array 40, are uniformed to have almost the same width in the fast axis direction and are bundled to the predetermined position as indicated at 2a in FIG. 3(B) or are condensed to the predetermined position as indicated at 2c–2e in FIG. 3(B). In this manner, the laser beams having passed the lens array 40 are collected to the predetermined position.

The optical fibers 30 (s, t) are arranged to locate the entrance surfaces thereof at the predetermined position in alignment with each other in the slow axis direction. More precisely, the predetermined position to which the lens array 40 collect the laser beams is a laser collective position which is at the distance of (S3+T3) from the emitting surface including the plural laser emitting parts. The laser collective position is at the distance of the focal length f60 from the slow axis beam collective lens 60. The entrance surfaces of the optical fibers 30 (s, t) are so located to receive the laser beams. In this particular instance, the emitting parts are sorted or divided into many groups each including those aligned in the fast axis direction, that is, into the groups separated in the slow axis direction, and the groups are associated with the optical fibers arranged in the slow axis direction. For example, five emitting parts 12 (1, 1), 12 (2, 1), 12 (3, 1), 12 (4, 1) and 12 (5, 1) which are on the rightmost row as viewed in FIG. 1 are grouped to be associated with the optical fiber 30 (1, 1) arranged leftmost as viewed in FIG. 1, and the five laser beams output therefrom and another five laser beams output from those on another row next thereto are collected to one piece of the optical fiber 30 (1, 1).

Since the spread angle θinx (e.g., 40 degrees) in the fast axis direction is sufficiently larger than that θiny (e.g., 3.5 degrees) in the slow axis direction, it is preferable to locate the lens array 40 as closely as possible with the emitting parts 12 (m, n). In the instance shown in FIG. 3(A), the lens array 40 is located very closely with the emitting parts 12 (m, n).

In the instance shown in FIGS. 3(A) and 3(B), each of the optical fibers 30 collects two laser beams in the slow axis direction, five laser beams in the fast axis direction and hence, ten laser beams in total.

(1-4. Configuration and Arrangement of Second Lenses on Lens Array)

Next, the configuration of the second lens (those indicated at 42a, 42c taken particularly) on the lens array 40b shown in FIG. 2(B) and the arrangement of the second lens will be described with reference to FIGS. 4(A), 4(B), 5(A) and 5(B).

Figure 4A:
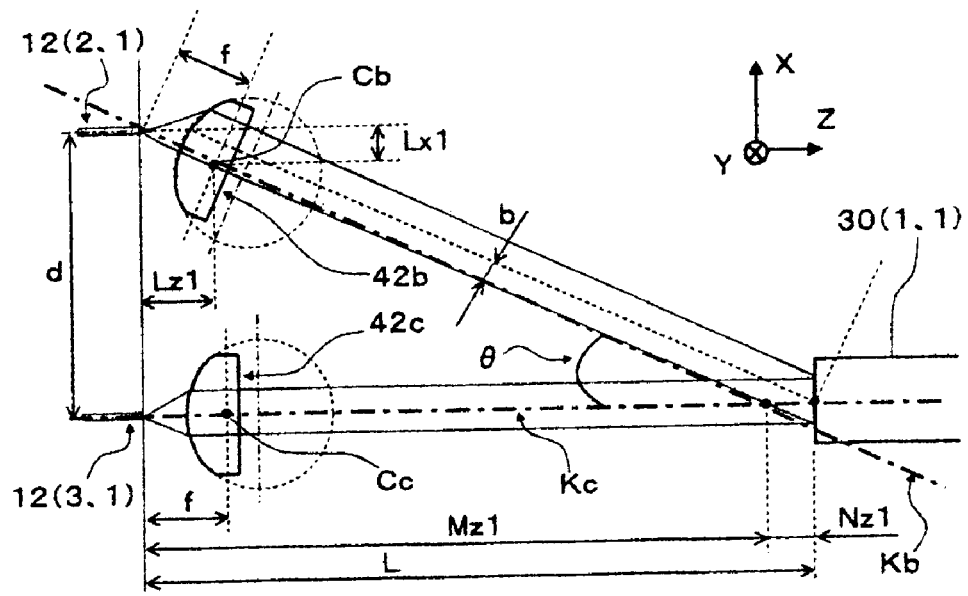
FIGS. 4(A) and 4(B) are explanatory views showing the positions to which second lenses in a lens array are to be set where the optical axes of the second lenses are inclined.
Figure 4B:
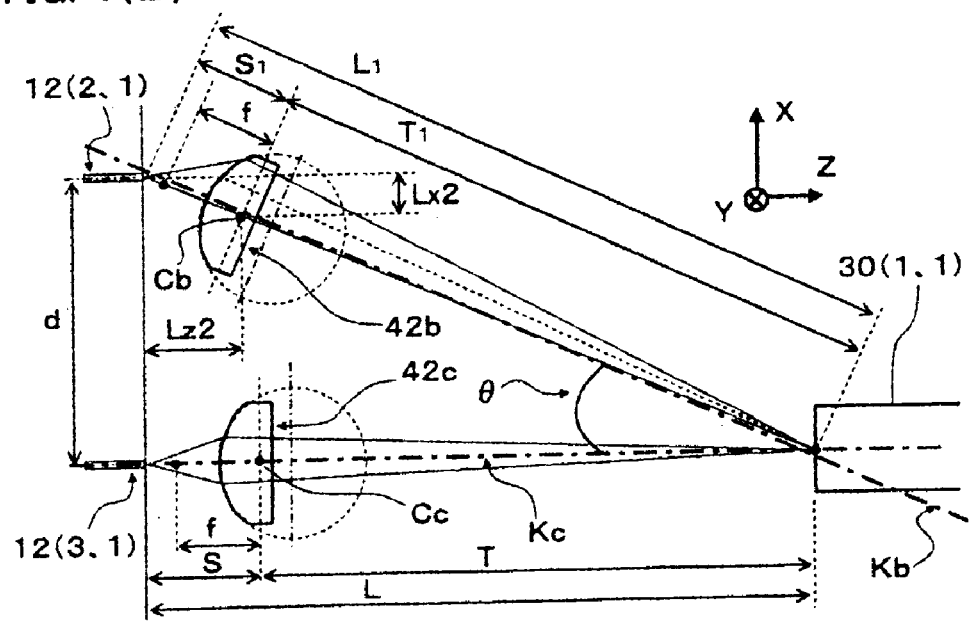

As shown in FIGS. 4(A) and 4(B), the optical axes of the second lenses are directed toward the laser collective position, and the positions of the second lenses have been adjusted in the direction (Z-axis direction) in which the laser beams travel as well as in the fast axis direction (X-axis direction).

Figure 5A:
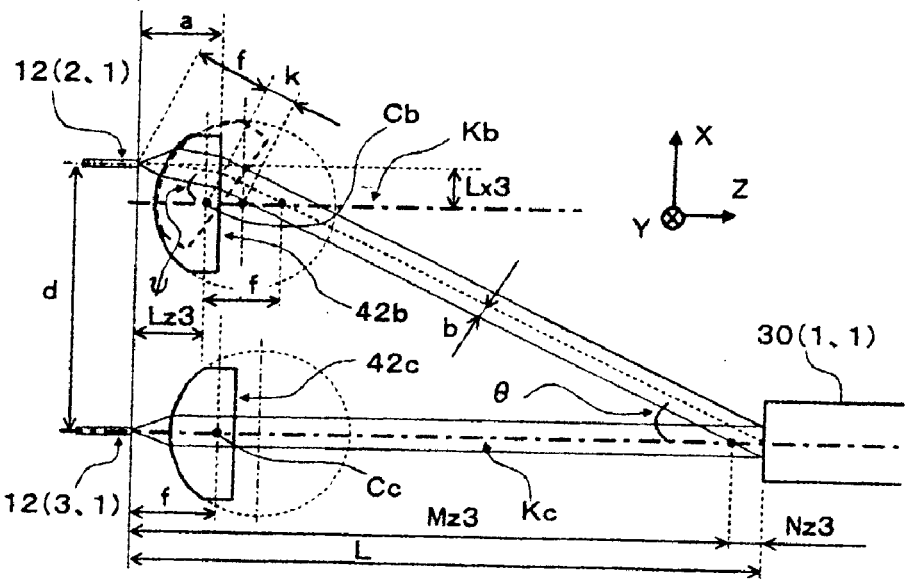
FIGS. 5(A) and 5(B) are explanatory views showing the positions to which the second lenses in the lens array are to be set where the optical axes of the second lenses are not inclined.
Figure 5B:
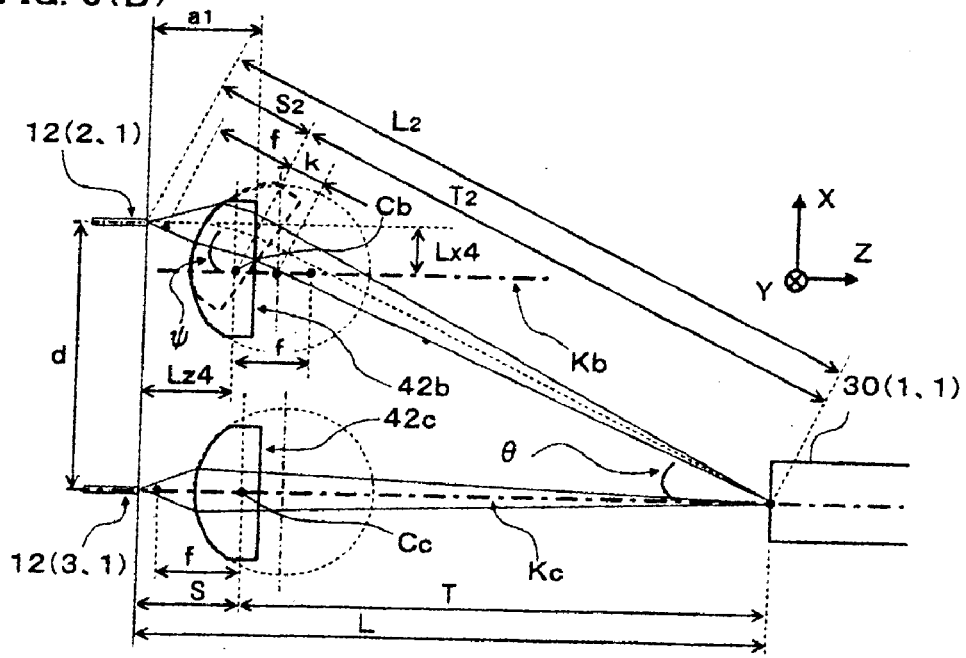

On the other hand, as shown in FIGS. 5(A) and 5(B), the optical axes of the second lenses are almost in parallel with the direction in which the laser beams travel, and the positions of the second lenses have been adjusted in the direction (Z-axis direction) in which the laser beams travel as well as in the fast axis direction (X-axis direction).

The arrangement of the second lens 42b corresponding to an emitting part 12 (2, 1) in the case of the optical axis being inclined will be described with reference to FIGS. 4(A) and 4(B). FIG. 4(A) exemplifies the arrangement for practicing the method of "bundling" laser beams, while FIG. 4(B) exemplifies the arrangement for practicing the method of "condensing" laser beams.

(1-5. Arrangement for Bundling Beams with Optical Axis being Inclined)

Referring to FIG. 4(A), the second lens 42c is arranged with the optical axis Kc thereof being in alignment with the line which connects an emitting part 12 (3, 1) with the laser collective position (i.e., the center on the entrance surface of an optical fiber 30 (1, 1) in this particular instance). Further, the second lens 42c is positioned with its principal point Cc being away by its focal length (f) from a corresponding emitting part 12 (3, 1).

With this arrangement, the laser beam output from the emitting part 12 (3, 1) is transformed to that having its width which is almost uniform over the length. The focal length (f) of the second lens 42c is selected taking the diameter of the optical fiber 30 (1, 1) into consideration for the reason that the elongation of the focal length (f) causes the laser beam to be widen after passing through the second lens 42c.

For arrangement of a second lens 42b, first of all, based on the numerical aperture NA represented by the sine of a maximum acceptance angle at which the laser beam is entered, the entrance angle θ is decided as follows:

$$\theta < \arcsin NA$$

Further, the distances Lx1 and Lz1 through which the principal point Cc of the second lens 42b is to be offset in the fast axis direction and in the beam traveling direction from the corresponding emitting part 12 (2, 1) are determined by the following equations.

$$Lx1 = f \ast \sin \theta$$

$$Lz1 = f \ast \cos \theta$$

Then, the distance in the fast axis direction between the emitting parts 12 (2, 1) and 12 (3, 1) is taken as (d), and the half of the width of the laser beam whose width is almost uniform over its length is taken as (b), wherein the distance (Mz1+Nz1) in the Z-axis direction between the emitting part 12 (2, 1) and the entrance surface of the optical fiber 30 (1, 1) are determined as follows:

$$Mz1 = d/\tan \theta$$

$$Nz1 = b/\sin \theta$$

As previously described, the distance (L) between the emitting part 12 (3, 1) and the optical fiber 30 (1, 1) has already been set in dependence upon the focal lengths (f50) and (f60) of the slow axis beam width uniforming lens 50 and the slow axis beam collective lens 60. Therefore, the focal lengths (f50), (f60) and the entrance angle (θ) are chosen to make the following equation hold.

$$d/\tan \theta + b/\sin \theta = f60 + f60 + f50 + f50$$

The same processing can be done for other emitting parts, so that the laser beams from all of the emitting parts 12 (m, n) at the same potion in the slow axis direction are efficiently collected to a corresponding one of the optical fibers 30.

(1-6. Arrangement for Condensing Laser Beams with Optical Axis being Inclined)

FIG. 4(B) shows the arrangement for this purpose, in which the second lens 42c is arranged with the optical axis Kc thereof being in alignment with the line which connects an emitting part 12 (3, 1) with the laser collective position (i.e., the center on the entrance surface of an optical fiber 30 (1, 1) in this particular instance). Further, the second lens 42c is positioned with its principal point Cc being away a farther distance (S) than its focal length (f) from a corresponding emitting part 12 (3, 1). Then, the distance between the principal point Cc and the entrance surface of the optical fiber 30 (1, 1) is taken as (T), and the parameters (f), (S) and (T) are determined to make the following equations hold.

$$1/f = 1/S + 1/T$$

Because of S+T=L, then the parameters (S) and (T) can be obtained as follows:

$$S = \{L - \sqrt{(L^2 - 4*L1*f)}\}/2$$

$$T = \{L + \sqrt{(L^2 - 4*L1*f)}\}/2 \text{ (provided: } S < T\text{)}$$

With this configuration, the laser beam output from the emitting part 12 (3, 1) is condensed to have its width narrowed gradually after passing the second lens 42c and is entered in the form of a small-spot intensive beam to the optical fiber 30 (1, 1).

For arrangement of a second lens 42b, first of all, the entrance angle θ of the beam from the lens 42b to the optical fiber 30 is determined as follows:

$$\theta < \arcsin(NA)$$

Further, the distances from the emitting part 12 (2, 1) to the entrance surface of the optical fiber 30 (1, 1) is taken as (L1), the distance from the emitting part 12 (2, 1) to the principal point Cb of the second lens 42b is taken as (S1), and the distance from the principal point Cb of the second lens 42b to the entrance surface of the optical fiber 30 (1, 1) is taken as (T1), wherein the following equations apply.

$$L1 = d/\sin\theta$$

$$S1 = \{L1 - \sqrt{(L1^2 - 4*L1*f)}\}/2$$

$$T1 = \{L1 + \sqrt{(L1^2 - 4*L1*f)}\}/2$$

Further, the distances Lx2 and Lz2 through which the principal point Cb of the second lens 42b is to be offset in the fast axis direction and in the beam traveling direction from the corresponding emitting part 12 (2, 1) are determined by the following equations.

$$Lx2 = S1*\sin\theta$$

$$Lz2 = S1*\cos\theta$$

The distance (L) in the Z-axis direction between the emitting part 12 (3, 1) and the entrance surface of the optical fiber 30 (1, 1) is determined as follows:

$$L = d/\tan\theta$$

As aforementioned, the distance (L) between the emitting part 12 (3, 1) and the optical fiber 30 (1, 1) has already been set as shown in FIG. 3(A) in dependence upon the focal lengths (f50) and (f60) of the slow axis beam width uniforming lens 50 and the slow axis beam collective lens 60. Therefore, the focal lengths (f50), (f60), the entrance angle (θ) and the like are chosen to make the following equation hold.

$$d/\tan\theta = f60 + f60 + f50 + f50$$

The same processing can be done for other emitting parts, so that the laser beams from all of the emitting parts 12 (m, n) at the same position in the slow axis direction are efficiently collected to a corresponding one of the optical fibers 30.

In the foregoing embodiment, the focal lengths (f) of the second lenses are kept constant to set the distances (S1) different for the second lenses. However, where the distances (S1) are to be kept constant, the focal lengths (f) of the second lenses may be set to have different values on a lens-by-lens basis. In this case, the distances (S1) are kept constant, and the focal lengths (f) and the distance (T1) for each second lens are determined as follows:

$$f = S1 - S1^2/L1$$

$$T1 = L1 - S1$$

In this modified case, the second lenses have different focal lengths (f) and hence, different curvatures. The farther the emitting part goes away from the center of the optical fiber in the fast axis direction (in other words, the larger the entrance angle of the beam to the optical fiber becomes), the longer the distance (L1) becomes and the larger the focal length (f) of the second lens, thereby enlarging the lens curvature. However, making the distances (S1) constant leads to making the effective diameters of the second lenses almost constant. This advantageously results in increasing the freedom in design of the second lenses under the circumstance that the spacing between the second lenses is restrained strictly.

As described above, in the embodiments shown in FIGS. 4(A) and 4(B), the optical axes of the second lenses (but one in alignment with the fiber) are inclined at different angles for the respective lenses to be directed to the entrance surface (i.e., the laser collective position) of the optical fiber. Further, the focal lengths (f) of the second lenses and the angles (θ) which the lines connecting the second lenses with the entrance surfaces of the optical fibers (i.e., laser collective positions) make with those normal to the entrance surfaces are taken into calculation, so that the distances (Lz1, Lz2) and (Lx1, Lx2) of the lenses from the emitting parts associated thereto in the Z-axis direction and the fast axis direction are determined to be different for the respective second lenses and to be of predetermined distances from the corresponding laser emitting surfaces.

Next described with reference to FIGS. 5(A) and 5(B) will be the arrangement of the second lens 42b relative to the emitting part 12 (2, 1) wherein the optical axis of the second lens, without being inclined, remains almost parallel with the laser travelling direction. FIG. 5(A) exemplifies the arrangement for practicing the method of "bundling" laser beams, while FIG. 5(B) exemplifies the arrangement for practicing the method of "condensing" laser beams.

(1-7. Arrangement for Bundling Laser Beams with Optical Axis being not Inclined)

Differences from the arrangement in FIG. 4(A) will be described with reference to FIG. 5(A).

The description of the location of the second lens 42c is omitted as being the same as that in FIG. 4(A).

The arrangement of the second lens 42b will be described hereinafter. The difference from that in FIG. 4(A) is that the optical axis (Kb) extends in parallel with the laser beam input thereto, without being inclined. Where the section of the second lens is a true circle, the characteristic of the second lens does not vary even if the lens surface of the same is swiveled around the center axis of the true circle. Therefore, the same effect as in FIG. 4(A) can be realized without inclining the optical axis if in the arrangement of FIG. 4, the second lens having an inclined optical axis is swiveled to make the optical axis parallel with the traveling direction of the laser beam input thereto. In this case, however, the laser beam is refracted at the output surface of the lens since the laser beam input in the lens does not reach the output surface at zero angles (i.e., at right angle). The refraction at the output surface is taken into account.

First of all, the incident angle ($\theta$) of the laser beam to the optical fiber 30 is determined as follows:

$$\theta < \arcsin (NA)$$

The following equation holds in the refraction of the beam at the output surface of the second lens 42b.

$$\psi = \arcsin\{(n1/n2)*\sin \theta\}$$

(wherein: n1: refractive index of air, n2: refractive index of second lens 42b)

The distance from the principal point Cb of the second lens 42b to the center of a true circle including the second lens 42b is take as (k), wherein the distances Lx3 and Lz3 through which the principal point Cb of the second lens 42b is to be offset in the fast axis direction and in the beam traveling direction from the corresponding emitting part 12 (2, 1) are determined by the following equations.

$$Lx3 = (f+k)*\sin \psi$$

$$Lz3 = (f+k)*\cos \psi - k$$

Then, the distance from the emitting parts 12 (2, 1) to the output surface of the second lens 42b is taken as (a), and the half of the width of the laser beam which width is made almost uniform over its length after the beam passes through the second lens 42b is taken as (b), wherein the distance (Mz3+Nz3) in the Z-axis direction between the emitting part 12 (2, 1) and the entrance surface of the optical fiber 30 (1, 1) are determined as follows:

$$Mz3 = a + (d-a/\tan \psi)/\tan \theta$$

$$Nz3 = b/\sin \theta$$

As described above, the distance (L) between the emitting part 12 (3, 1) and the optical fiber 30 (1, 1) has already been determined as shown in FIG. 3 (A) in dependence upon the focal lengths (f50) and (f60) of the slow axis beam width uniforming lens 50 and the slow axis beam collective lens 60. Therefore, the focal lengths (f50), (f60) and the entrance angle ($\theta$) are chosen make the following equation hold.

$$a + (d-a/\tan \psi)/\tan \theta + b/\sin \theta = f60 + f60 + f50 + f50$$

The same processing can be done for other emitting parts, so that the laser beams from all of the emitting parts 12 (m, n) at the same position in the slow axis direction are efficiently collected to a corresponding one of the optical fibers 30.

(1-8. Arrangement for Condensing Beams with Optical Axis being not Inclined)

Differences from the arrangement in FIG. 4(B) will be described with reference to FIG. 5(B).

The description of the location of the second lens 42c is omitted as being the same as that in FIG. 4(B).

The arrangement of the second lens 42b will be described hereinafter. The difference from that in FIG. 4(B) is that the optical axis (Kb) extends in parallel with the laser beam input thereto, without being inclined. The same effect as in FIG. 4(B) can be realized without inclining the optical axis if in the arrangement of FIG. 4, the second lens having an inclined optical axis is swiveled to make the optical axis parallel with the traveling direction of the laser beam input thereto. The refraction at the output surface is taken into account.

First of all, the incident angle ($\theta$) of the laser beam to the optical fiber 30 is determined as follows:

$$\theta < \arcsin (NA)$$

The following equation holds in the refraction of the beam at the output surface of the second lens 42b.

$$\psi = \arcsin\{(n1/n2)*\sin \theta\}$$

Further description will be omitted because of being the same as those referred to FIGS. 5(A) and 4(B).

Although the optical axes and locations of the second lenses are properly set for respective lenses in the embodiments shown in FIGS. 4(A) and 4(B) and the locations of the second lenses are properly set for respective lenses in the embodiments shown in FIGS. 5(A) and 5(B), a modification may be made wherein the optical axes and locations of the second lenses are properly set for respective lenses.

For smaller affection by aberration, the curvature of the convex surface of the second lens may be varied partly. This modification advantageously results in further improving the efficiency in collecting the laser beams.

As described above, in the embodiments shown in FIGS. 5(A) and 5(B), the optical axis of each second lens is set almost in parallel with the direction in which the laser beam output from a corresponding emitting part travels. Further, the distances Lz3, Lz4 and Lx3, Lx4 through which the principal point Cb of each second lens 42b is to be offset in the beam traveling direction are determined in taking into account the focal length of each such second lens and the angle $\theta$ which the line connecting each such second lens with the entrance surface (laser collective position) of the optical fiber makes with the line normal to the entrance surface, so that each such second lens can be set at the predetermined position (fourth predetermined position) depending on itself from the corresponding laser emitting part.

A super-high precision machining apparatus is necessary to form the foregoing second lenses. For the apparatus, there can be used those disclosed in Japanese patent publication Nos. 7-100752 and 7-299746.

2. Second Embodiment:

The second embodiment features removing or omitting the slow axis beam width uniforming lens 50 from the first embodiment for simplicity.

Figure 6:
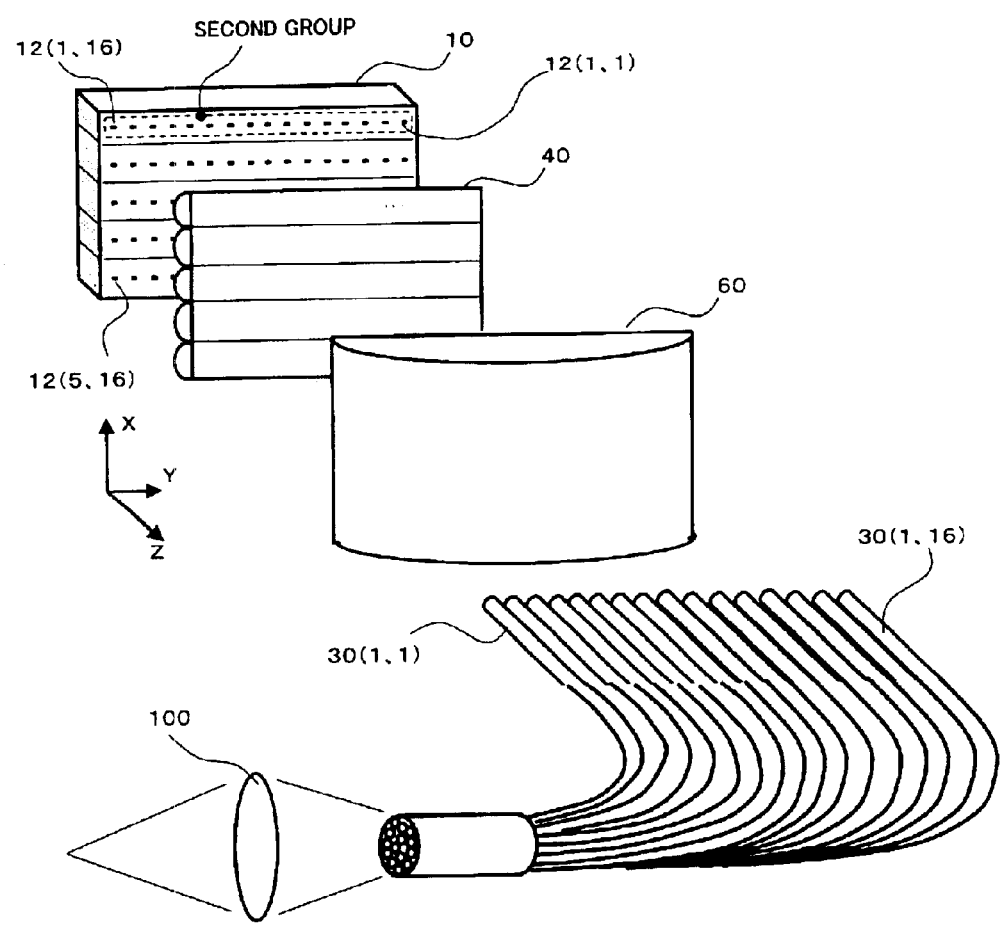
FIG. 6 is a perspective view showing the general configuration of a laser beam collecting device of the second embodiment according to the present invention.
Figure 14:
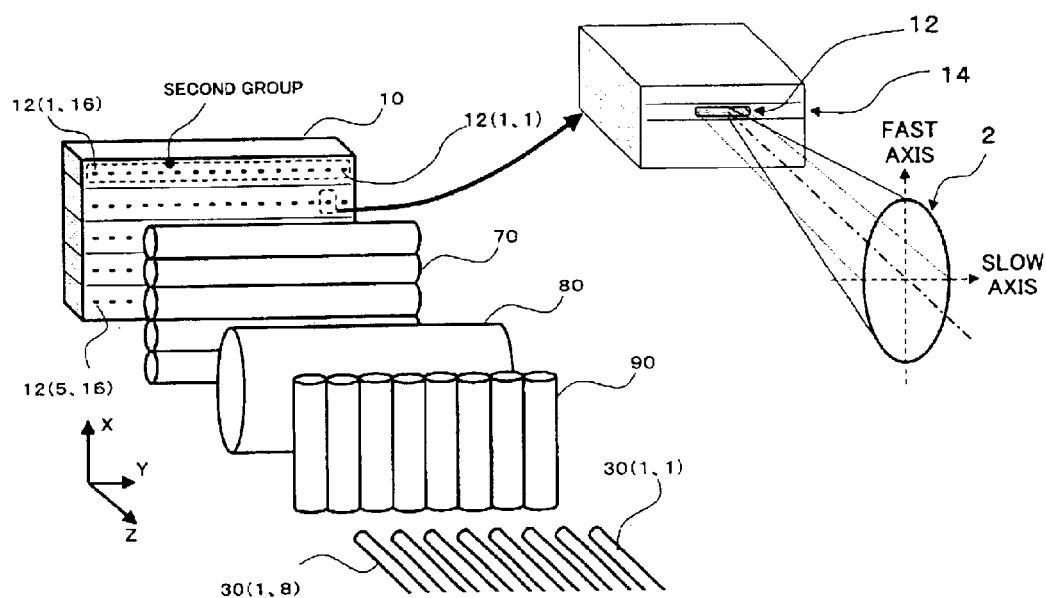
FIG. 14 is a perspective view illustrating a laser beam collecting device of prior art.
Figure 15A:
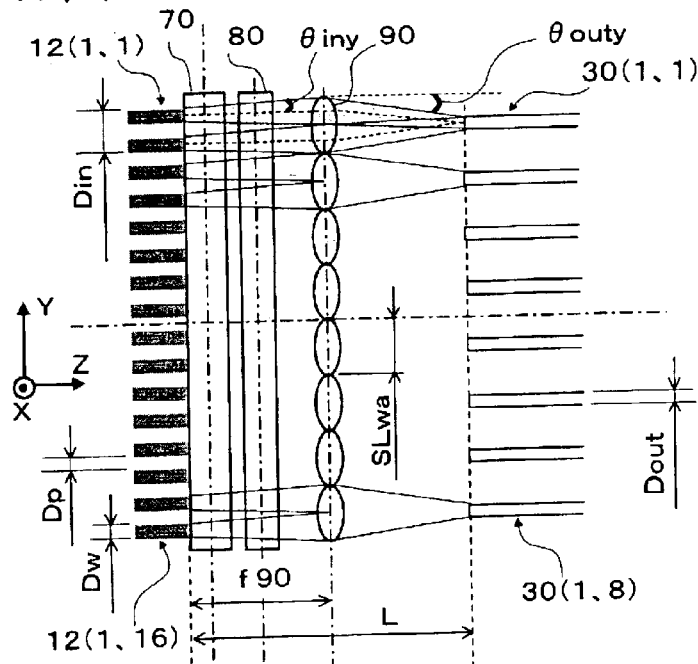
FIGS. 15(A) and 15(B) are explanatory views showing the arrangement of lenses and the state of laser beams being collected through the lenses in the prior art.
Figure 15B:
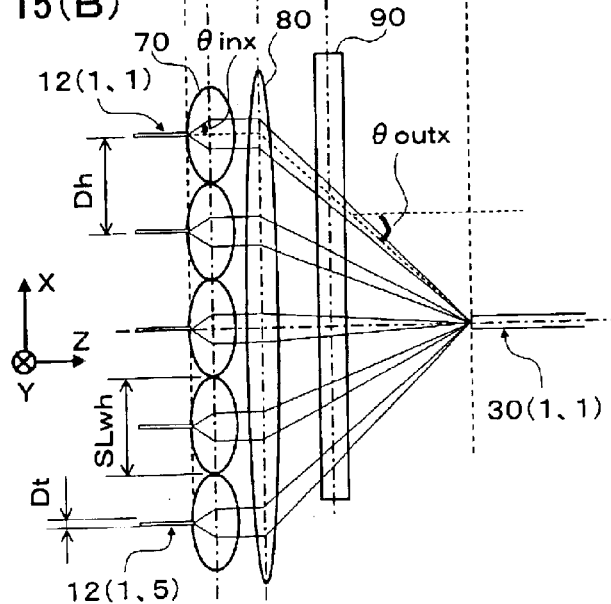

In the second embodiment shown in FIG. 6, a much longer distance can be provided, as is true in the first embodiment, between the semiconductor laser array 10 and the optical fibers 30 in comparison with that in the aforementioned laser beam collecting device shown as prior art in FIG. 14. For this reason, the arrangement of the lenses is easier, and the laser collection can be realized much more efficiently because the incident angle to the optical fibers is made smaller.

In addition, thanks to the omission of the slow axis beam width uniforming lens 50, the second embodiment compared with the first embodiment can be simplified in construction and when assembled, can be adjusted much easier for, e.g., fine adjustment in the arrangement of lenses or the like.

(2-1. General Construction)

FIG. 6 shows the general construction of a laser beam collecting device with a lens array as the second embodiment according to the present invention.

The second embodiment in FIG. 6 is not provided with the aforementioned uniforming lens 50 and is different in the number of the optical fibers 30 used in comparison with the first embodiment shown in FIG. 1. The number of the optical fibers 30 can be varied depending on the dimension of the focal length (f60) of the slow axis beam collective lens 60. Further description will be omitted because other parts of the construction including the lens array are the same as those corresponding in the first embodiment.

(2-2. Arrangement of Components and State of Laser Beam being Collected)

Description will be made with reference to FIG. 7 as to the arrangement of the emitting parts 12, the lens array 40, the slow axis beam collective lens 60 and the optical fibers 30 and as to the state of laser beams being collected. FIG. 7(A) is illustrative of the components as viewed in the fast axis direction, depicting the state in which the laser beams are being refracted in the slow axis direction and being collected. On the other hand, FIG. 7(B) is illustrative of those as viewed in the slow axis direction, depicting the state in which the laser beams are being refracted in the fast axis direction and being collected.

Next, with reference to FIG. 7(A), description will be made hereafter as to how the laser beams output from the emitting parts 12 (m, n) are collected to the entrance surfaces of the optical fibers 30 (s, t). In FIG. 7(A), the focal length of the slow axis beam collective lens 60 is taken as f60 (e.g., 30 mm).

The slow axis beam collective lens 60 is located at a position apart a distance (S4) from the emitting parts 12 (m, n), and the optical fibers 30 (m, n) are located at a position apart a distance (T4) from the slow axis beam collective lens 60. The distances S4 and T4 are determined as follows:

$$1/S4 + 1/T4 = 1/f60$$

(In the instance shown in FIG. 7, S4=60 mm, T4=60 mm)

Further, the angle at which each laser beam output from the emitting parts 12 (m, n) spreads on one side in the slow axis direction is taken as θiny (e.g., 3.5 degrees), while the incident angle in the slow axis direction of the laser beam which enters into the optical fiber 30 (s, t) is taken as θouty (e.g., 10 degrees).

In lens selection, the slow axis beam collective lens 60 is selected to have the focal lengths f60 which satisfies the number (t) of the targeted optical fibers 30 (s, t) in the slow axis direction and the radius Dout thereof based on the aforementioned parameters Din, Dp, Dw and θiny of the emitting parts 12 (m, n).

The entrance surfaces of the optical fibers 30 (s, t) are on a line which is away by a predetermined distance (i.e., the sum of S4+T4 in this particular embodiment) from the emitting surface including the plural emitting parts 12 (m, n) and which extends almost in parallel with the slow axis direction. This position where the entrance surfaces of the optical fibers 30 (s, t) are put in alignment will be referred to as "laser collective position."

Description for the lens array 40 is omitted because it hardly effects on the laser beams in the slow axis direction.

The laser beam output from each emitting part 12 (m, n) gradually spreads at the angle θiny (e.g., 3.5 degrees) with respect to the Z-axis and in due course, overlaps with another laser beam next to. Since the overlapped laser beams travel in parallel with the optical axis of the slow axis beam collective lens 60, they are collected to respective positions apart a distance of (S4+T4) from the emitting parts 12 (m, n) after passing through the slow axis beam collective lens 60 where the aforementioned equation 1/S4+1/T4=1/f60 holds.

The optical fibers 30 (s, t) are arranged with the entrance surfaces thereof being arranged at the positions (of the distance S4+T4 from the emitting parts 12 (m, n)) to which the slow axis beam collective lens 60 collects the laser beams, and the beams enter into the optical fibers 30 (s, t) from the entrance surfaces thereof.

Figures 7A, 7B:
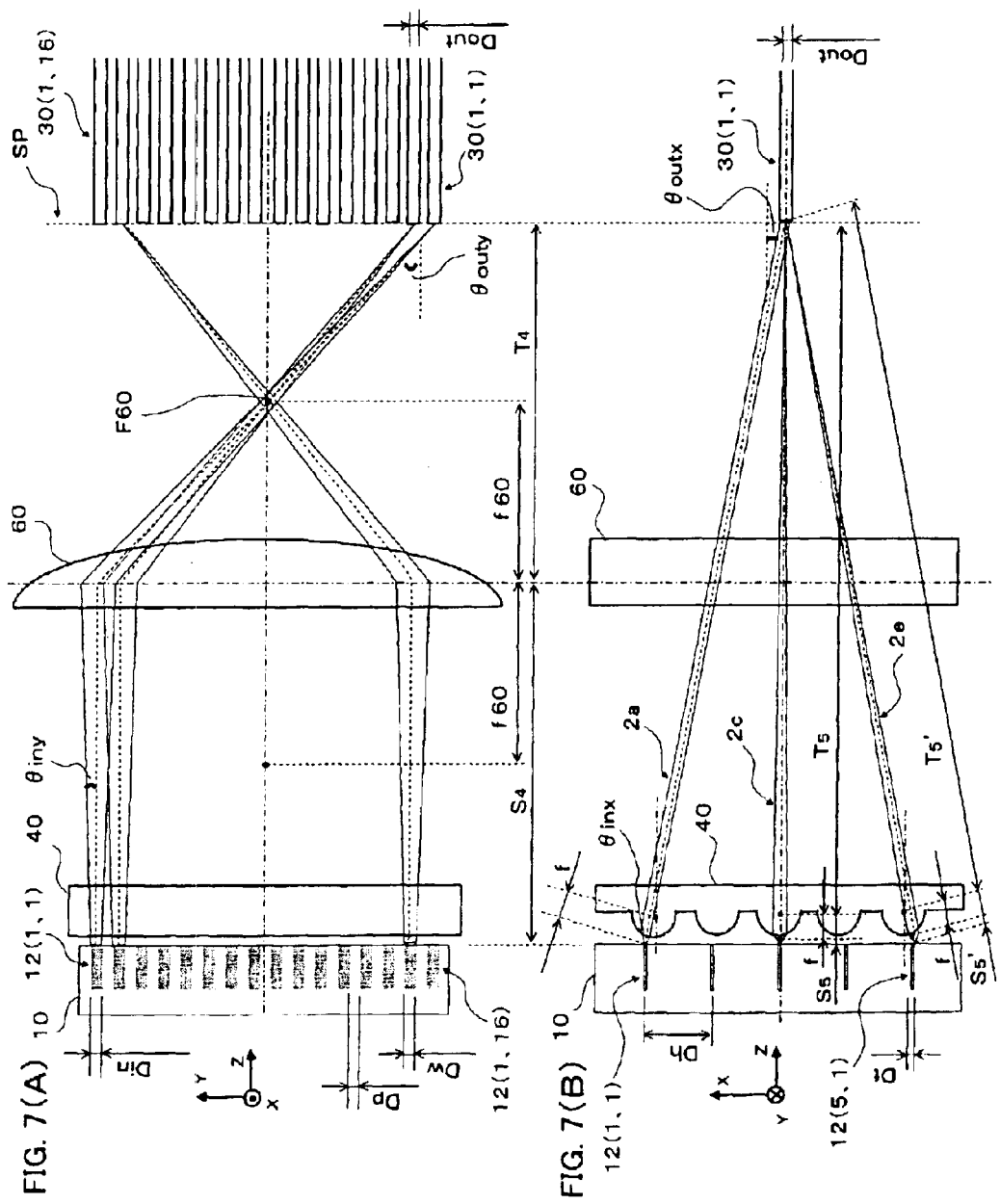
FIGS. 7(A) and 7(B) are explanatory views showing the arrangement of lenses and the state of laser beams being collected through the lenses in the second embodiment.

In the fast axis direction, as depicted in FIG. 7(B), the laser beams are collected to the position (laser collective position) to which the slow axis beam collective lens 60 collects the beams. The arrangement and operation of the components shown in FIG. 7(B) are substantially the same as those in FIG. 3 (B). Therefore, further description therefor will be omitted for the sake of brevity.

Further, the following construction and arrangements which can be employed in the second embodiment are the same as those described in the foregoing first embodiment, and therefore, description as to the following construction and arrangements will be omitted to avoid the repetition.

Configuration and Arrangement of Second Lenses of Lens Array

Arrangement for Bundling Laser Beams with Optical Axes being Inclined

Arrangement for Condensing Laser Beams with Optical Axes being Inclined

Arrangement for Bundling Laser Beams with Optical Axes being not Inclined

Arrangement for Condensing Laser Beams with Optical Axes being not Inclined

3. Third Embodiment:

The third embodiment features omitting the lens array 40 and the slow axis beam collective lens 60 in the second embodiment and substituting optical waveguides 20 therefor.

Figure 8:
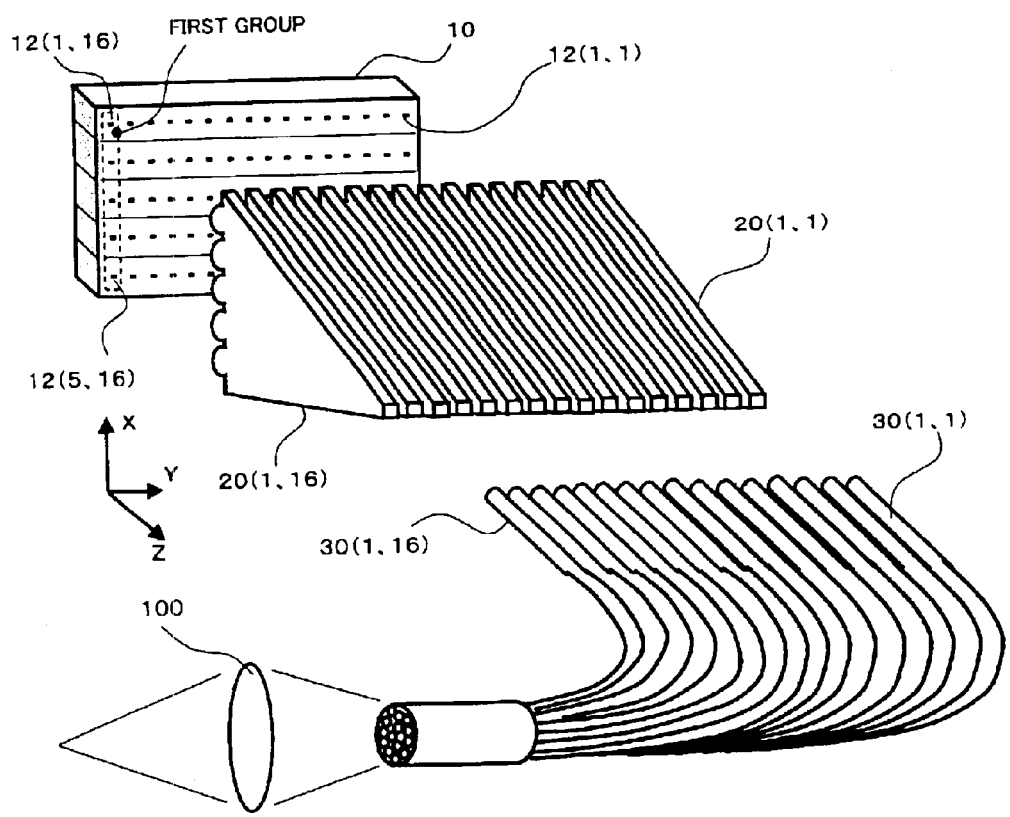
FIG. 8 is a perspective view showing the general configuration of a laser beam collecting device of the third embodiment according to the present invention.

In the third embodiment shown in FIG. 8, a much longer distance than that in the aforementioned laser beam collecting device shown as prior art in FIG. 14 can be provided between the semiconductor laser array 10 and the optical fibers 30, as is true in the first embodiment. For this reason, the arrangement of the lenses is easier, and the laser collection can be realized much more efficiently because the incident angle to the optical fibers is made smaller.

In addition, thanks to omitting the lens array 40 and the slow axis beam collective lens 60 from the arrangement of the second embodiment and providing the optical waveguides 20 instead, the third embodiment can be much more simplified in construction than the second embodiment and when assembled, can be adjusted much easier than the first and second embodiments for, e.g., fine adjustment in the arrangement of lenses or the like.

(3-1. Overall Construction)

FIG. 8 shows the general construction of a laser beam collecting device as the third embodiment having the optical waveguides 20 (s, t) according to the present invention.

In the third embodiment shown in FIG. 8, the emitting parts 12 (m, n) are divided into a plurality of first groups each including those parts aligned in the fast axis direction, and the laser beams in each of the first groups are collected by a corresponding one of optical waveguides 20 (s, t) and are entered therefrom into a corresponding one of the optical fibers 30 (s, t). Other parts in construction are the same as those corresponding in the first embodiment, and description of such other parts will be omitted for brevity.

(3-2. General Configuration of Optical Waveguides)

Next, the general configuration of the optical waveguides 20 will be described with reference to FIG. 9. Each of the optical waveguides 20 is constituted having a plurality of cylindrical lens 22a–22e (first lenses) whose center axes extends in the slow axis direction and which are spaced at regular interval in the fast axis direction.

Figure 9:
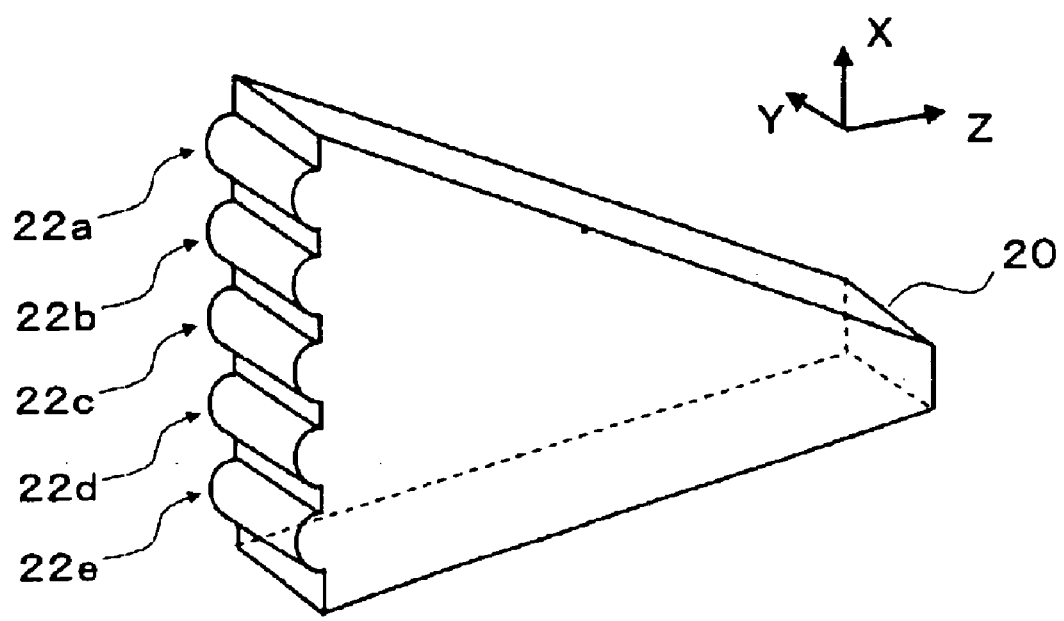
FIG. 9 is a perspective view illustrating an optical waveguide used in the third embodiment.

In the waveguide exemplified by FIG. 9, a surface where the first lenses 22a–22e are arranged is taken as an entrance surface for laser beams to enter, while a surface opposite to the entrance surface is taken as an output surface for the laser beam to be output. In order that the input laser beams are collected to be output from the output surface, the size of the output surface is made smaller in the fast axis direction (X-axis direction) than that of the entrance surface. Namely, the waveguide takes the form of a taper as viewed from a lateral side thereof. The waveguide in this particular embodiment has the entrance and output surfaces whose sizes in the slow axis direction (Y-axis direction) are the same. However, the waveguide may be modified to have the output surface whose size in the slow axis direction is smaller than the entrance surface. The waveguide may be made of various kinds of materials such as, for example, glass or the like.

(3-3. Arrangement of Components and State of Laser Beams being Collected)

Next, description will be made with reference to FIGS. 10(A) and 10(B) as to the arrangement of the emitting parts 12, the optical waveguides 20, and the optical fibers 30 and as to the state of laser beams being collected. FIG. 10(A) is illustrative of the components as viewed in the fast axis direction. The laser beams output from each first group of the emitting parts 12 are entered into a corresponding one of the optical waveguides 20 and travel without passing outside the waveguides while repetitively reflecting within the same. The beams then reach the output surfaces of the waveguides and entered into the entrance surfaces of the optical fibers.

FIG. 10(B) is illustrative of those as viewed in the slow axis direction, depicting the state in which the laser beams are being refracted in the fast axis direction and being collected. In FIG. 10(B), the focal length of the first lenses 22a–22e of the waveguides 20 is taken as (f).

The optical waveguides 20 (s, t) are located to be aligned respectively with the first groups of the emitting parts in the Z-axis direction. Each of the optical waveguides 20 (s, t) is also located at such a position in the Z-axis direction that the focal points of the first lenses 22a–22e thereof coincide with the emitting parts of a corresponding first group, namely, that the first lenses 22a–22e are spaced by the focal length (f) from the emitting parts of the corresponding first group. With the waveguides 20 so located, the laser beams passing through the waveguides are uniformed in the widths thereof and are collected (bundled in this case) as indicated at 2a in FIG. 10(B).

As indicated at 2c–2e in FIG. 10(B), each of the optical waveguides 20 (s, t) may be located with the first lenses 22a–22e are located at such a position (S6) a littler farther away than the focal length (f) from the emitting parts of the corresponding first group. The parameters S6 and T6 may be determined so that the equation (1/S6+1/T6=1/f) holds, and the optical fibers 30 (s, t) may be located with the entrance surfaces thereof being at a distance (S6+T6) from the emitting parts 12. In this modified arrangement, the laser beams passing through the waveguides 20 (s, t) are collected (condensed in this case) as indicated at 2c–2e in FIG. 10(B).

(3-4. Configuration and Arrangement of First Lenses of Optical Waveguide)

Next, description will be made with reference to FIGS. 11(A) and 11(B) as to the configuration and arrangement of first lenses (i.e., first lenses 22b, 22c) in the optical waveguide 20.

Where each lens is arranged with the focal axis being inclined, the same is directed toward the output surface of the waveguide, and the lens is moved in the beam traveling direction (Z-axis direction) and in the fast axis direction (X-axis direction) to locate the lens at a first predetermined distance from the corresponding emitting part.

Figure 11A:
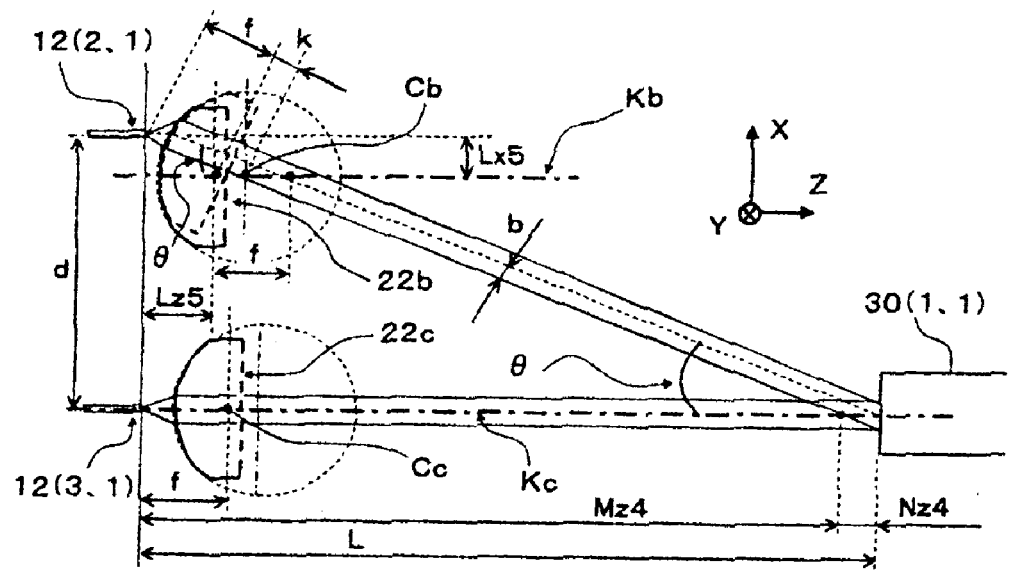
FIGS. 11(A) and 11(B) are explanatory views showing the positions to which first lenses of the optical waveguide are to be set where the optical axes of the first lenses are not inclined.
Figure 11B:
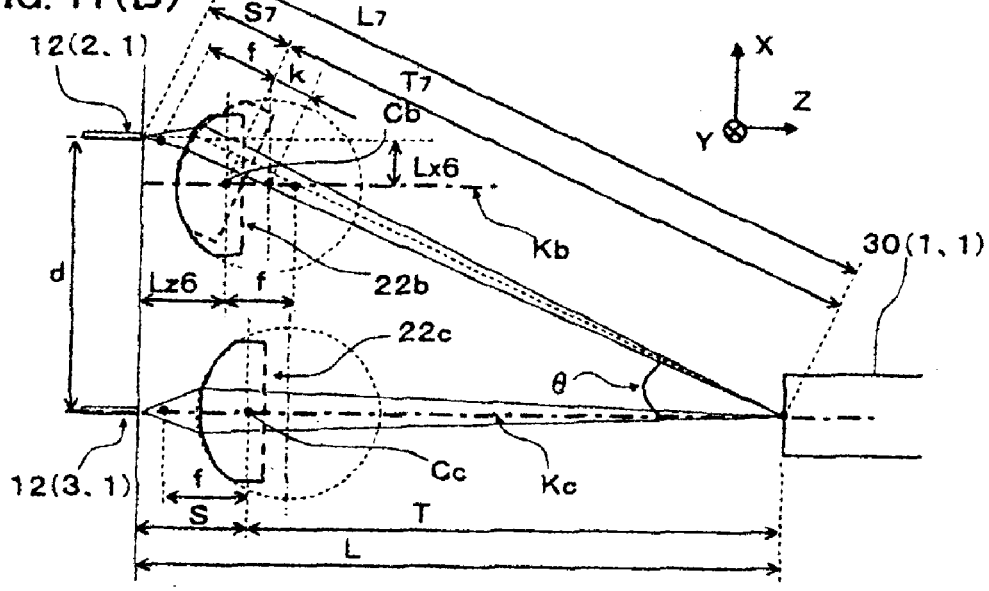

In FIGS. 11(A) and 11(B), the focal axis of the first lens is illustrated extending in the beam traveling direction, and the first lens is located at the position moved in the beam traveling direction (Z-axis direction) and in the fast direction (X-axis direction).

FIGS. 11(A) and 5(A) are the same as each other in that the focal axis of the first lens is made extend almost in parallel with the laser beam input thereto without being inclined. The input laser beam is refracted at the output surface when being output in the case of FIG. 5(A), and similarly, it is refracted at the output surface when being output in the case of FIG. 11(A). In this case, the angle that the beam after refraction makes is to be set not to exceed the arc sin (NA). Moreover, it is the same as described already that in the case of the first lens whose section is a true circle, the characteristic of the first lens does not varies when the same is swiveled around the center of the true circle. Accordingly, it is to be noted that the embodiments shown in FIGS. 11(A) and 4(A) operate in the same manner and so do those shown in FIGS. 11(B) and 4(B).

The arrangement for bundling the laser beams with the focal axes being inclined in this third embodiment is almost the same as that shown in FIG. 4(A) and the arrangement for condensing the laser beams with the focal axes being inclined in this third embodiment is almost the same as that shown in FIG. 4(B). Therefore, description of these arrangements will be omitted for the sake of brevity.

In this case, however, the focal axes of the first lenses are made inclined at different angles depending on the respective first lenses so that they can be inclined toward the optical fiber 30 corresponding thereto (i.e., toward the output surface corresponding thereto). In addition, the distances Lz5, Lz6 and Lx5, Lx6 through which the principal point Cb of each first lens 22b is to be offset in the beam traveling direction and in the fast axis direction are determined in taking into account the focal length (f) of each second lens 22b and the angle θ which the line connecting each first lens with the entrance surface (the output surface of the optical waveguide corresponding thereto) of the optical fiber corresponding thereto makes with the line normal to the laser emitting surface (the angle θ being made by each second lens with the entrance surface), so that each first lens can be set at the predetermined position (the first predetermined position) depending on itself from the corresponding laser emitting part.

Further, the arrangement for bundling the laser beams with the focal axis Kb of the first lens being not inclined in FIG. 11(A) is almost the same as that shown in FIG. 4(A), and the arrangement for condensing the laser beams with the focal axis Kb of the second lens being not inclined in FIG. 11(B) is almost the same as that shown in FIG. 4(B). Therefore, description of these arrangements will be omitted for the sake of brevity.

In this case, however, the optical axes of the first lenses are made extend almost in parallel with the traveling direction of the laser beams output from the emitting surfaces. In addition, the distances Lz5, Lz6 and Lx5, Lx6 through which the principal point Cb of each first lens 22b is to be offset in the beam traveling direction and in the fast axis direction are determined in taking into account the focal length (f) of each first lens 22b and the angle θ which the line connecting each first lens with the entrance surface (the output surface of the optical waveguide corresponding thereto) of the optical fiber corresponding thereto makes with the line normal to the laser emitting surface (the angle θ being made by each first lens with the entrance surface), so that each first lens can be set at the predetermined position (the second predetermined position) depending on itself from the corresponding laser emitting part.

Although in the aforementioned embodiments, the first lenses are provided at the entrance surface of each optical waveguide 20, there may be employed a modified constitution which is not provided with such first lenses 22b, 22c. In this modified case, the laser beams entered into the optical waveguide corresponding thereto are not refracted to travel toward the output surface of the waveguide, but are repeated to reflect within the waveguide to travel toward the output surface. In this configuration employed. It is preferable to elongate each waveguide in the beam traveling direction for smaller refraction angle and hence, higher efficiency in beam collection (in other words, for smaller incident angle from the emitting parts).

(3-5. Other Constitutions using Optical Waveguides)

Figure 12A:
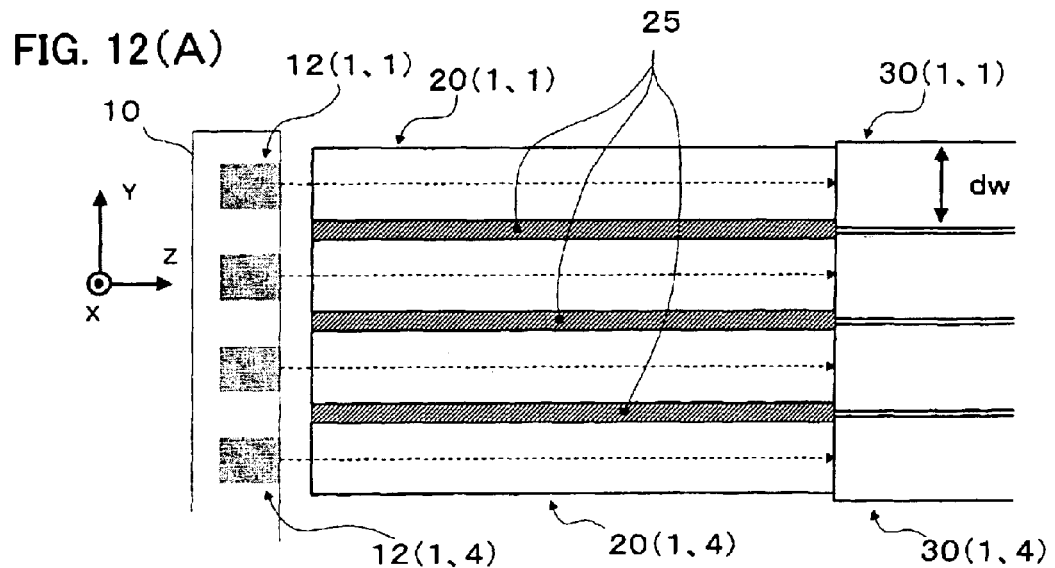
FIGS. 12(A) and 12(B) are explanatory views illustrating the arrangement of the optical waveguides and the assembly which bodily units the optical waveguides and low refraction index members each interposed between any two waveguides.
Figure 12B:
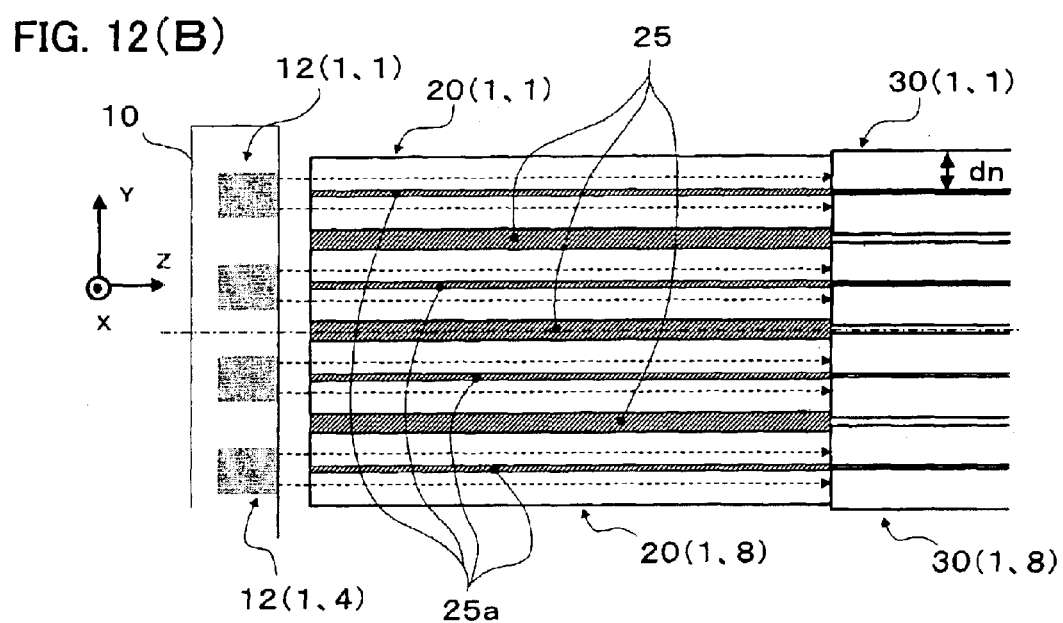

Optical waveguide assemblies each of which is constructed by uniting or integrally making up those shown in FIG. 10(A) will be described with reference to FIGS. 12(A) and 12(B). FIGS. 12(A) and 12(B) respectively illustrate the assemblies as viewed in the fast axis direction, and for better understanding, they are depicted in a dimension different from that in FIG. 10(A).

In the assembly shown in FIG. 12(A), the dimension in the slow axis direction of each optical waveguides 20 (s, t) is made narrower than the center-to-center distance of the emitting parts 12 (m, n) but wider than the dimension in the slow axis direction of the emitting parts 12 (m, n). Thus, the laser beam output from any one of the emitting parts 12 (m, n) is properly entered into a corresponding one of the optical waveguides 20 (s, t), wherein no interference occurs between the laser beams traveling within one waveguide and those traveling within another.

Further, a low refraction index member 25 of a thin plate having a smaller refraction index than that of the waveguides 20 (s, t) is interposed between any two adjacent waveguides 20 (s, t), and the waveguides 20 (s, t) and the low refraction members 25 arranged in the slow axis direction are united bodily. This advantageously makes the dimension of the waveguide assembly large in the slow axis direction, so that supporting the assembly in machining the first lenses can be eased thereby to make the machining easier. With the waveguides so assembled, the same can be arranged as a laser beam collecting device at a predetermined position, and the fine adjustment of the locations of the waveguides can be done as a unit without laborious adjustments needed one by one for the respective waveguides, whereby the adjustment of the waveguide assembly can be done conveniently.

In the waveguide assembly shown in FIG. 12(B), the dimension in the slow axis direction of each waveguides 20 (s, t) is made narrower than that of each emitting part 12 (m, n). Thus, the laser beam output from each emitting part 12 (m, n) can be split to be entered properly into two or more waveguides 20 (s, t) (into two in the example shown in FIG. 12(B)). Further, the waveguides 20 (s, t) are set lest the split laser beams traveling within the two or more number of the waveguides 20 (s, t) should interfere with one another, so that the radius (dn) of the optical fibers 30 can be made smaller. Like those shown in FIG. 12(A), a low refraction index member 25 or 25a of a thin plate having a smaller refraction than that of the waveguides 20 (s, t) is interposed between any adjacent two waveguides 20 (s, t), and the waveguides 20 (s, t) and the low refraction index members 25, 25a arranged in the slow axis direction are united bodily. The low refraction index members 25a which face at one ends thereof with the emitting parts 12 (m, n) are preferable to be as thin as possible.

Figure 13A:
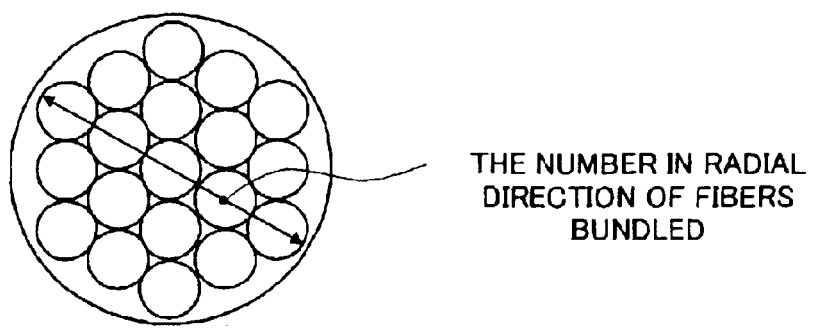
FIGS. 13(A) and 13(B) are an explanatory view illustrating the output surface of optical fibers bundled and a graph showing the advantages realized where fine optical fibers are used.

Other advantages realized by making the diameter of the optical fibers 30 small will be described with reference to FIGS. 13(A) and 13(B). FIG. 13(A) shows the section of a cable bundling nineteen (19) optical fibers. Generally, since the section of each optical fiber 30 is circular, the fibers 30 are bundled with no clearance therebetween as shown in FIG. 13(A). In this particular instance, the number in the radial direction of the fibers bundled is five.

Figure 13B:
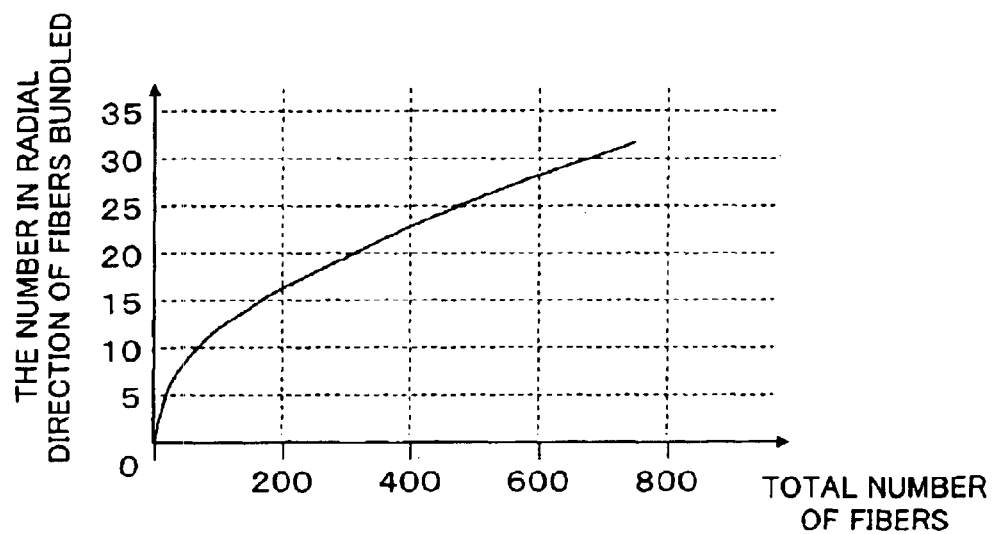

FIG. 13(B) is a graph showing the number in the radial direction relative to the total number of the fibers where plural numbers of the optical fibers are bundled. The graph indicates that even when the total number is doubled, the number in the radial direction remains less than the double. It can therefore be realized that in collecting laser beams output from plural emitting parts 12 to plural optical fibers 30, the diameter of the cable in the case of 400 fibers bundled in the manner shown in FIG. 12(B) is made smaller than that of the cable in the case of 200 fibers bundled in the manner shown in FIG. 12(A), providing that the diameter of the fibers used in the former is the half of that of the fibers used in the latter. Therefore, the beam parameter product which is indicated by the product of the beam radius and the spreading angle (half angle) can be improved, and at the same time, the handling of the cable can be made easier.

Figure 16:
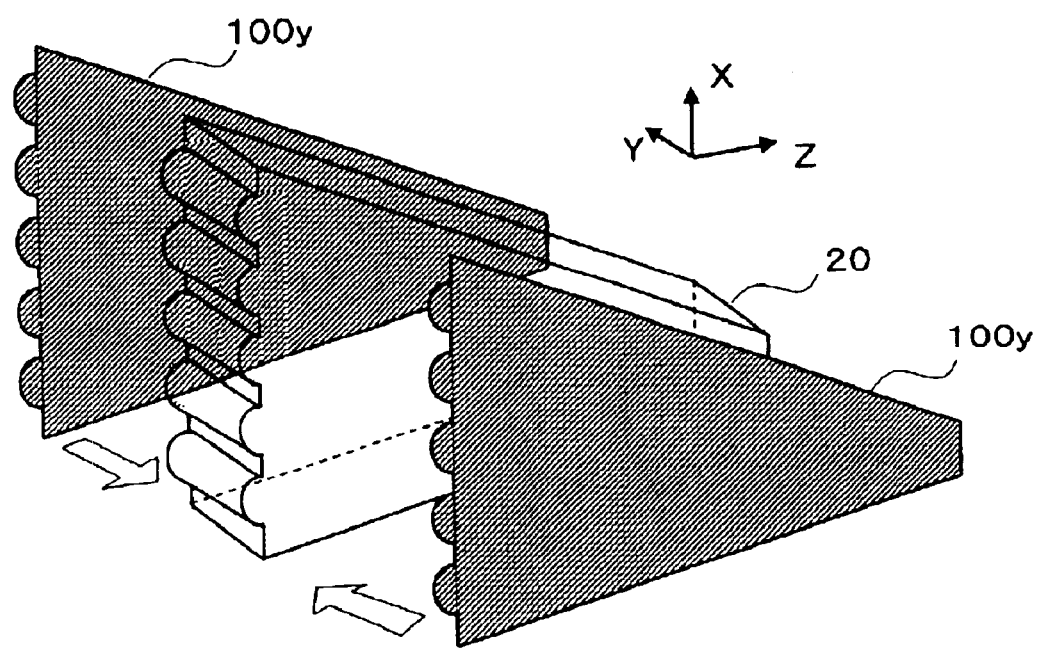
FIG. 16 is a perspective view illustrating the arrangement of an optical waveguide of the forth embodiment according to the present invention.

4. Forth Embodiment:

The forth embodiment features covering the lateral surfaces (intersecting the slow axis direction) of each optical waveguide 20 as used in the third embodiment with total reflecting members 100y as shown in FIG. 16. Thus, the laser beam entered into the waveguide 20 is prevented from coming out therefrom to arrive entirely at the output surface of the waveguide 20, whereby the beam collecting efficiency in the slow axis direction can be further improved.

The method of covering with the total reflecting member 100y includes vaporizing silver on the lateral surfaces, affixing to the lateral surfaces metallic plates like sliver plates whose surfaces have been finished to mirror surfaces, or the like. The total reflecting members 100y must be of the characteristic capable of totally reflecting the laser beam, but may be of any material. It may be of any thickness and is not limited of whether it is a film or a plate.

(4-1. Configuration of Optical Waveguides and State of Laser Beams being Collected)

Figure 17A:
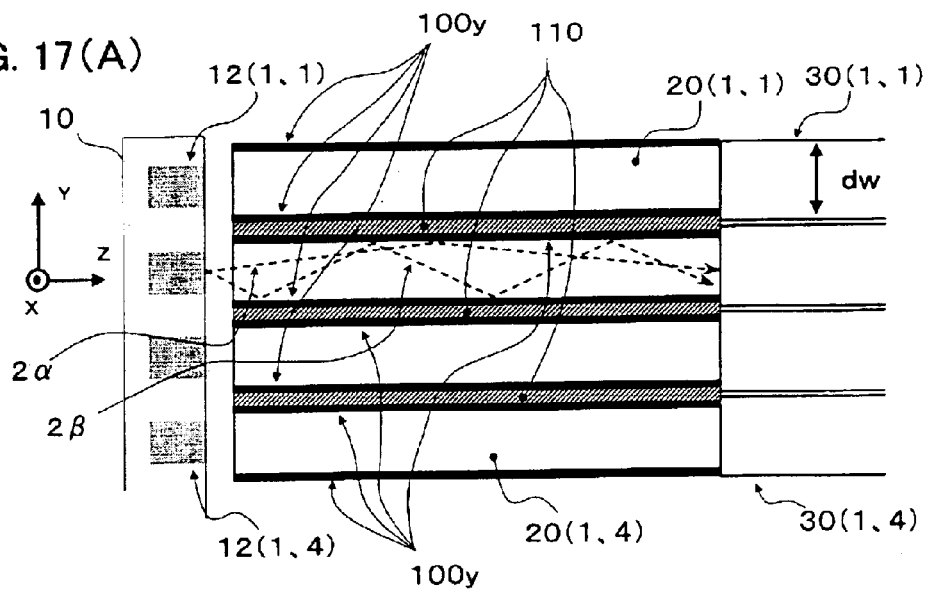
FIGS. 17(A) and 17(B) are explanatory views illustrating the state of laser beams being collected within the optical waveguides and by total reflecting members in the forth embodiment.

FIG. 17(A) shows another laser beam collecting device which is constituted by arranging plural optical waveguides described in the fourth embodiment. Like that in the third embodiment described with reference to FIG. 12, the waveguides 20 are arranged to correspond respectively to the emitting parts 12 arranged in the slow axis direction. A layer spacing in the slow axis direction between each optical waveguide and the next thereto includes a layer of the total reflecting member 100y capable of totally reflecting laser beams.

In the arrangement shown in FIG. 17(A), a spacing layer is formed by sandwiching a spacing member 110 between two total reflecting members 100. The spacing member 110 may be composed of any material, because the laser beams are completely reflected back by the total reflecting members 100y before coming into the spacing member 110. The total reflecting members 100y may be formed on, or affixed to, the lateral surfaces of the spacing member 110 or may be formed on, or affixed to, the lateral surfaces of the optical waveguides 20.

The spacing layer may be formed with at least a piece of the total reflecting member 100y only, or may be of the configuration wherein at least a piece of the total reflecting member 100y is sandwiched with two spacing members 110. Where the configuration that the total reflecting member 100y is sandwiched with the spacing members 110 is taken, the spacing member 110 must be of enabling the laser beam to pass therethrough, but may be of material having any refractive index.

As described above, at least the layer of the total reflecting member 100y is formed at the spacing layer between each optical waveguide 20 and the next thereto in the slow axis direction.

Figure 17B:
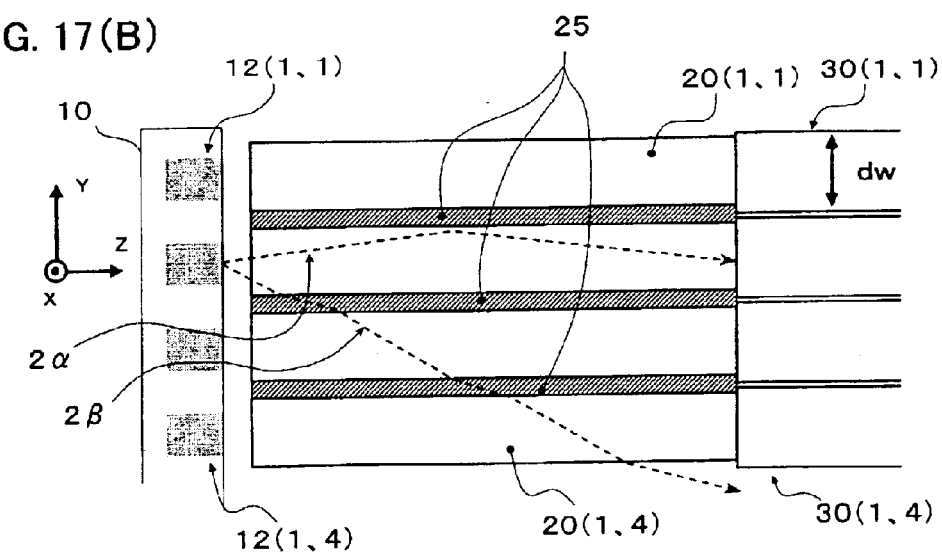

In the third embodiment shown in FIG. 17(B) wherein the spacing layer 25 between each optical waveguide 20 and the next thereto is made of a material of a low refractive index, it is likely that when there is generated a laser beam whose angle in the slow axis direction (Y-axis direction) relative to the laser traveling direction (Z-axis direction) is relatively large (i.e., when there is generated a laser beam indicated at 2β in FIG. 17(B)), such laser beam comes outside the optical waveguide 20 to which it was entered.

To the contrary, in the fourth embodiment shown in FIG. 17(A) wherein a layer of the total reflecting member 100y is formed in the spacing layer between each waveguide 20 and the next thereto, even when there is generated a laser beam (that indicated at 2β in FIG. 17(A)) whose angle in the slow axis direction (Y-axis direction) relative to the laser traveling direction (Z-axis direction) is relatively large, such laser beam does not come outside the waveguide 20 to which it was entered and is transmitted reliably to the output surface of the waveguide 20. As a result, the efficiency can be improved in collecting laser beams in the slow axis direction.

5. Fifth Embodiment:

This fifth embodiment is different from the third and forth embodiments in that an optical waveguide 20a is composed at least of the section of the first lenses and in that the laser transfer layer within which the laser beams having passed through the first lens section travel is formed as a cave. The laser beam is refracted when reaching the cave after passing through the first lens, and the angle of this refraction is taken into account in adjusting the position of the first lens.

Figure 18:
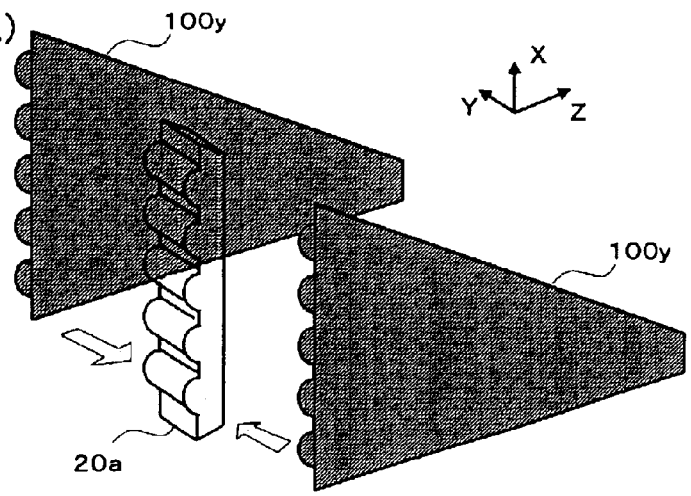
FIGS. 18(A), 18(B) and 18(C) are explanatory views illustrating the configurations of optical waveguides used in the fifth embodiment according to the present invention and the state of laser beams being collected by the optical waveguides and total reflecting members.
Figure 18:
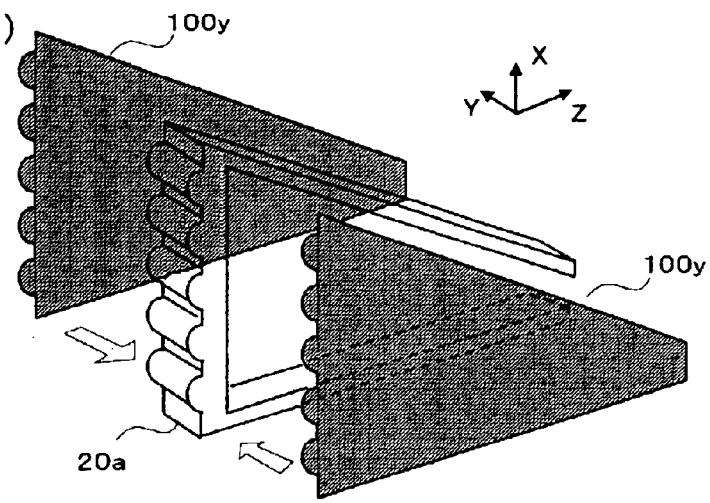
Figure 18:
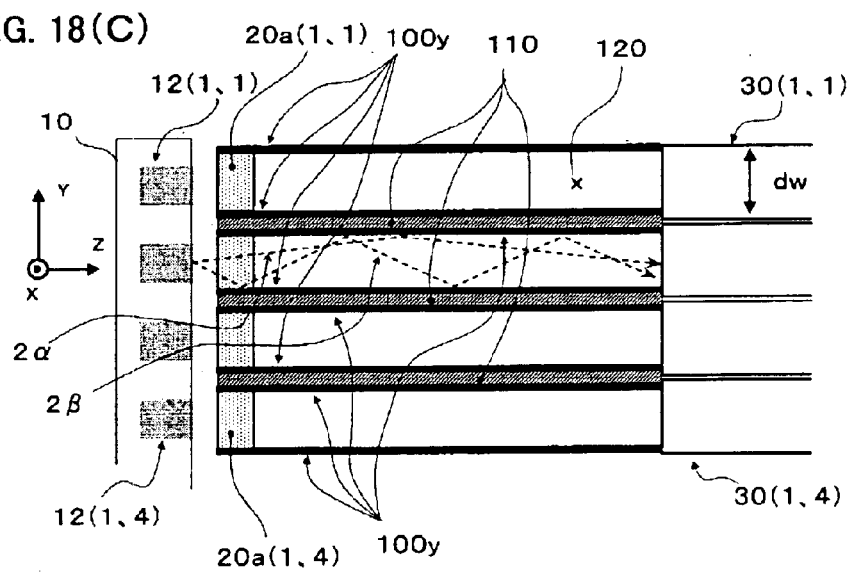

FIGS. 18(A) and 18(B) respectively show examples wherein the beam transfer layer of the optical waveguide 20a as described in the fourth embodiment takes the form of a cave. The method of forming the cave is not limited to these examples, and various method for that purpose can be practiced.

The method of forming a cave in the optical waveguide used in the third embodiment is practiced in the same manner as described above and will be omitted for the sake of brevity.

(5-1. Configuration of Optical Waveguides and State of Laser Beams being Collected in Slow Axis Direction)

FIG. 18(C) shows an example which is constituted by arranging plural optical waveguides in the fifth embodiment. Even when there are generated laser beams (like that indicated at 2β) which are relatively large in the angle deviating from the beam traveling direction (Z-axis direction) toward the slow axis direction (Y-axis direction), such beams do not go out of the waveguide 20a to which they are entered, that is, from the space 120 which is defined and covered by the optical waveguide 20a composed of the first lens section and the total reflecting members 100y. Therefore, once entering into the optical waveguide 20a, the laser beam can be transmitted from the waveguide 20a to the terminal part of the space 120 (i.e., to the entrance surface of the optical fiber 30). Consequently, the efficiency in collecting the laser beam in the slow axis direction can be heightened as is true in the forth embodiment.

(5-2. State of Laser Beams being Corrected in Fast Axis Direction)

Figure 19A:
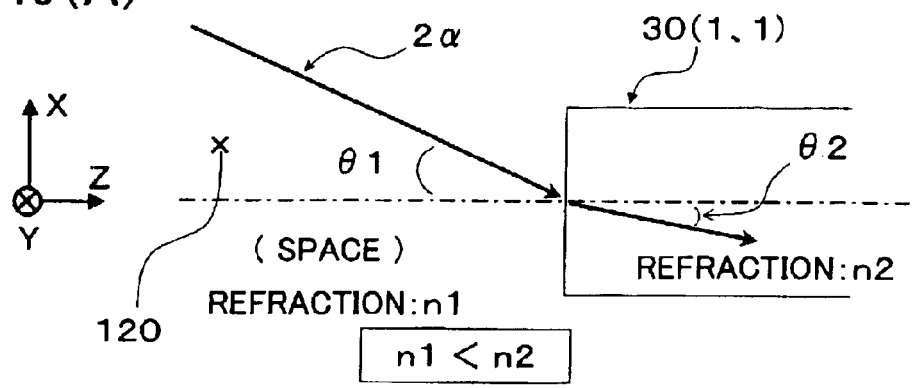
FIGS. 19(A) and 19(B) are explanatory views illustrating the angle which a laser beam entered into an optical fiber makes with the longitudinal direction of the fiber.

Next, description will be made with reference to FIGS. 19(A) and 19(B) as to the state that in the fifth embodiment, laser beams are collected in the fast axis direction. FIG. 19(A) depicts the laser collecting state in the fast axis direction in the fifth embodiment, while FIG. 19(B) depicts the laser collecting state in the fast axis direction in the third and forth embodiments.

Referring now to FIG. 19(A), the space (cave) 120 is occupied by the atmospheric air, whose refractive index is taken as n1. Further, the refractive index of the optical fiber 30 is taken as n2. Usually, the relation of the refraction index n1<the refraction index n2 holds. A part or segment of the laser beam traveling within the space (cave) 120 is indicated at 2α, and the angle which is made between the beam segment 2α and the longitudinal direction of the optical fiber 30 is taken as θ1. And, the angle which the direction in which the beam segment 2α travels after entering into the optical fiber 30 makes with the longitudinal direction of the optical fiber 30 is taken as θ2.

In this case, since the relation of the refraction index n1<the refraction index n2 holds, the relation θ1>θ2 also holds. This advantageously results in restraining the quantity of the beam which goes outside the optical fiber 30 after being entered thereinto and before arriving at the terminal end of the fiber 30. Consequently, the efficiency in collecting the beams in the fast axis can be further heightened.

Figure 19B:
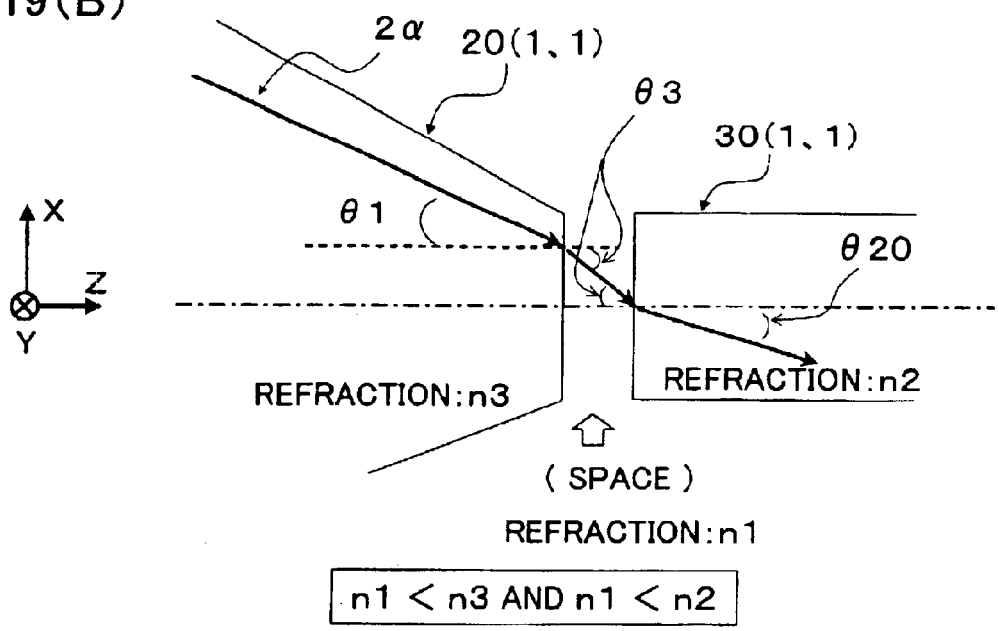

In the third and fourth embodiments, on the other hand, it may be the case that a space is present between the waveguide 20 and the optical fiber 30 as shown in FIG. 19(B). In this case, the space is occupied by the atmospheric air, whose refractive index is taken as n1, and the refractive indexes of the waveguide 20 and the optical fiber 30 are taken respectively as n3 and n2, wherein the relations n1<n2 and n1<n3 hold usually.

Further, a segment of the laser beam traveling within the optical waveguide 20 is taken as 2α, and the angle which the beam segment 2α makes with the longitudinal direction of the optical fiber 30 is taken as θ1 like that in FIG. 19(A). The angle which the direction in which the beam segment 2α travels after entering into the optical fiber 30 makes with the longitudinal direction of the optical fiber 30 is taken as θ20. Further, taken as θ3 are the angle which the beam segment 2α output from the output surface of the waveguide 20 makes with the longitudinal direction of the optical fiber 30 and the angle which the beam segment 2α to enter into the entrance surface of the optical fiber 30 makes with the longitudinal direction of the optical fiber 30.

In this case, since the relation n1<n3 holds, the relation θ1<θ34 also holds. And, since the relation n1<n2 holds, the relation θ3>θ20 holds.

In comparison of FIG. 19(A) with FIG. 19(B), it can be readily understood that as the relation θ1 <θ3 holds, the relation θ2<θ20 holds. In short, the efficiency in collecting laser beams in the fast axis direction (X-axis direction) can be heightened much larger in the fifth embodiment shown in FIG. 19(A) having no space between the waveguide 20 and the optical fiber 30, than the arrangement shown in FIG. 19(B).

The series of the refractions shown in FIG. 19(B) do not take place in the case that the output surface of the waveguide 20 is kept in perfect contact with the entrance surface of the optical fiber without intervening any clearance therebetween. In this case, it is preferable that the refractive index n2 be set larger than the refractive index n3.

In the same manner that the waveguide 20, 20a in the fourth and fifth embodiments is provided with the total reflecting members 100y at the surfaces thereof which extend across the slow axis direction (Y-axis direction), the waveguide 20, 20a in any of the third to fifth embodiments may be provided with such total reflecting members 100y at other surfaces thereof which extend across the fast axis direction (X-axis). Where the total reflecting members 100y are provide at the surfaces extending transversely of the fast axis direction, the quantity of the beam which goes outside the waveguide 20 in the fast axis direction can be restrained, whereby the efficiency in collecting the beams in the fast axis direction (X-axis direction) can be further heightened.

It is to be noted that the optical waveguides, the lens array and the laser beam collecting device according to the present invention are not limited to those configuration, forms, arrangement and the like as described in the embodiments, and various modifications, additions and deletions may be possible without departing from the gist of the present invention.

The optical waveguides, the lens array and the laser beam collecting device according to the present invention are applicable to various kinds of apparatus utilizing laser beams. The numerical definitions of various parameters are by way of examples and are no to be limited to those numerical definitions The shape and dimension of each lens are not to be limited to those described in the embodiments and indicated in the accompanying drawings. The lens used in the present invention may be those wherein so far as one surface thereof is a curvature, the other surface may be either a flat or a curvature.

Although the waveguides described in the embodiments are constituted to collect laser beams from plural emitting parts arranged in the fast axis direction, they may take the configuration to collect laser beams from those arranged in the slow axis direction.

Obviously, various other modifications and variations of the present invention are possible in light of the above teachings. It is therefore to be understood that within the scope of the appended claims, the present invention may be practiced otherwise than as described herein.

What is claimed is:

1. An optical waveguide for receiving from an entrance surface thereof plural laser beams which travel as spreading in fast and slow axis directions and collecting the plural input laser beams in a predetermined direction to output from an output surface thereof, said waveguide being constituted such that the dimension of said output surface is made smaller in said fast axis direction than that of said input surface and that laser beams emitted from plural laser emitting parts arranged in said fast axis direction are input from said entrance surface and collected in said fast axis direction to be output from said output surface.

2. An optical waveguide as set forth in claim 1, wherein:
the number of said laser emitting parts arranged in said fast axis direction and the distance between two adjacent laser emitting parts have been confirmed in advance;
said entrance surface of said waveguide is provided in correspondence to said laser emitting parts with plural first lenses for refracting and collecting laser beams entered thereinto in said fast axis direction; and
each of said plural first lenses is positioned with an optical axis thereof being inclined toward said output surface of said optical waveguide.

3. An optical waveguide as set forth in claim 2, wherein:
each of said first lenses provided on the entrance surface of said optical waveguide is offset first predetermined distances from a corresponding one of said laser emitting parts in the beam traveling direction and in said fast axis direction, and said first predetermined distances are determined for each said first lens in taking into account the focal length of each said first lens and an angle which each said first lens makes with said output surface of said waveguide.

4. An optical waveguide as set forth in claim 1, wherein:
the number of said laser emitting parts arranged in said fast axis direction and the distance between two adjacent laser emitting parts have been confirmed in advance;
said entrance surface of said waveguide is provided in correspondence to said laser emitting parts with plural first lenses for refracting and collecting laser beams entered thereinto in said fast axis direction;
each of said plural first lenses is positioned with an optical axis thereof being almost in parallel with the beam traveling direction of a laser beam input thereinto; and
the distances through which each said first lens is to be offset in the beam traveling direction and in said fast axis direction are determined to be first predetermined distances for each said first lens in taking into account the focal length of each said first lens and an angle which each said first lens makes with said output surface of said waveguide.

5. Optical waveguides each comprising said optical waveguide as set forth in claim 1 for collecting plural laser beams output from plural laser emitting parts arranged in said fast axis direction and said slow axis direction, and wherein:
the number of said laser emitting parts arranged in said fast and slow axis directions and the distances in said fast and slow axis directions between two adjacent laser emitting parts have been confirmed in advance;
said plural laser emitting parts are divided into plural first groups spaced from one another in said slow axis direction;
the dimension of each said optical waveguide is determined to be smaller than the distance in said slow axis direction between the centers of two adjacent laser emitting parts, but to be larger than the length in said slow axis direction of each said laser emitting part; and
plural waveguides are arranged in said slow axis direction respectively in correspondence to said plural first groups of said laser emitting parts arranged in said slow axis direction.

6. Optical waveguides each comprising said optical waveguide as set forth in claim 1 for collecting in a predetermined direction plural laser beams which are output from plural laser emitting parts arranged in said fast axis direction and said slow axis direction, and wherein:
the number of said laser emitting parts arranged in said fast and slow axis directions and the distances in said fast and slow axis directions between two adjacent laser emitting parts have been confirmed in advance;
said plural laser emitting parts are divided into plural first groups spaced from one another in said slow axis direction;

the dimension in said slow axis direction of each said optical waveguide is determined to be smaller than the distance in said slow axis direction between the centers of two adjacent laser emitting parts; and at least two waveguides are arranged for each of said plural first groups of said laser emitting parts arranged in said slow axis direction.

7. Optical waveguides as set forth in claim 5, wherein:

low refractive index members whose refractive index is smaller than that of said optical waveguides are sandwiched each between each said optical waveguide and the next thereto so that said low refractive index members and said optical waveguides are composed bodily in an alternate arrangement.

8. A laser beam collecting device comprising said optical waveguide as set forth in claim 1, optical fibers and a collective lens for collecting laser beams output from plural laser emitting parts, and wherein:

the number of said laser emitting parts arranged in said fast and slow axis directions and the distances in said fast and slow axis directions between two adjacent laser emitting parts have been confirmed in advance;

said plural laser emitting parts are divided into plural first groups spaced from one another in said slow axis direction;

optical waveguides are arranged in said slow axis direction in correspondence respectively to said plural first groups;

entrance surfaces of said optical fibers are arranged at the output surfaces of said optical waveguides respectively;

said optical fibers are bundled to make output surfaces thereof arranged as desired; and said collective lens is provided at the side of said output surfaces of said optical fibers;

whereby laser beams output from plural laser emitting parts which are arranged in said fast and slow axis directions are collected by said optical waveguides in said fast axis direction to be entered from said optical waveguides into said optical fibers respectively, and whereby the laser beams output from said output surfaces of said optical fibers are then collected by said collective lens.

* * * * *